US008589510B2

(12) United States Patent
Jackson

(10) Patent No.: US 8,589,510 B2
(45) Date of Patent: Nov. 19, 2013

(54) METHOD AND SYSTEM OF SYNCHRONIZING ACCOUNTING OBJECTS BETWEEN A CLIENT AND SERVER

(76) Inventor: Paul Alexander Jackson, Toronto (CA)

(*) Notice: Subject to any disclaimer, the term of this patent is extended or adjusted under 35 U.S.C. 154(b) by 292 days.

(21) Appl. No.: 13/062,378

(22) PCT Filed: Sep. 4, 2009

(86) PCT No.: PCT/CA2009/001219
§ 371 (c)(1),
(2), (4) Date: Mar. 4, 2011

(87) PCT Pub. No.: WO2010/025554
PCT Pub. Date: Mar. 11, 2010

(65) Prior Publication Data
US 2011/0173294 A1   Jul. 14, 2011

Related U.S. Application Data

(60) Provisional application No. 61/094,441, filed on Sep. 5, 2008.

(51) Int. Cl.
*G06F 15/16* (2006.01)
(52) U.S. Cl.
USPC ......................................................... 709/217
(58) Field of Classification Search
USPC ......................................................... 709/217
See application file for complete search history.

(56) References Cited

U.S. PATENT DOCUMENTS

| 6,339,777 | B1 | 1/2002 | Attaluri et al. |
| 7,143,194 | B1 | 11/2006 | Curley et al. |
| 2005/0192989 | A1 | 9/2005 | Adiba et al. |
| 2008/0040367 | A1 | 2/2008 | Bitonti et al. |
| 2008/0320151 | A1* | 12/2008 | McCanne et al. ............. 709/228 |

OTHER PUBLICATIONS

International Search Report for corresponding PCT/CA2009/001219, completed Nov. 30, 2009 by Wei Wang of the Canadian Intellectual Property Office.
SQL Server 2005 Books Online, Publishing Data and Database Objects Available at: http://msdn.microsoft.com/en-us/library/ms152559(SQL.90).aspx; Oct. 10, 2007.

* cited by examiner

*Primary Examiner* — Benjamin R Bruckart
*Assistant Examiner* — Ronak Patel

(57) ABSTRACT

A method and system of synchronizing accounting objects between a client and server are provided. In accordance with one embodiment, there is provided a method for use on a server of synchronizing data between a client accounting database on a client computer and the server accounting database on the server, the client computer and server being connected over a communication network by a persistent connection, each of the client accounting database and server accounting database comprising a number of tables, wherein accounting objects are defined by a group of one or more related records in one or more tables in the client accounting database and server accounting database.

19 Claims, 7 Drawing Sheets

METHOD AND SYSTEM OF SYNCHRONIZING ACCOUNTING OBJECTS BETWEEN A CLIENT AND SERVER

CROSS-REFERENCE TO RELATED APPLICATIONS

This application claims the benefit of and priority to provisional U.S. Patent Application No. 61/094,441, filed Sep. 5, 2008, the content of which is incorporated herein by reference.

TECHNICAL FIELD

The present disclosure relates generally to the synchronization of data, and more particularly to a method and system of synchronizing accounting objects between a client and server.

BACKGROUND

Client-server applications often require the synchronization of data between client and server components of the application. Examples of client-server applications requiring the synchronization of data are third party applications built on the QuickBooks® accounting software provided by Intuit Inc. A software developer's kit (SDK) provided for QuickBooks provides an interface between third party applications and QuickBooks which allows third party applications to query, add, edit and delete records from a QuickBooks client accounting database via the QuickBooks SDK. Using the QuickBooks SDK, third party applications can send XML (eXtensible Markup Language) requests and receive XML responses to interact with QuickBooks and the respective client accounting database(s). Other accounting software products such as PeachTree™ provided by Sage Software, Simply Accounting™ provided by Sage Software, Microsoft Dynamics™ provided by Microsoft Corporation, and Microsoft Small Business Accounting™ provided by Microsoft Corporation, each have SDKs and/or application programming interfaces (APIs) which provide similar functionality for third party application developers.

An example of a "synching tool" for synchronizing accounting data between a client and server is QuickBooks Web Connector™. QuickBooks Web Connector is a local application on the client computer which acts as a shuttle between a third party developer's Web service and the QuickBooks SDK. The connection is initiated on the client computer which receives a set of "requests" from the Web service, processes the requests, and returns a set of responses to the developer's Web service. The initiation of a "synchronization operation" (also referred to as a "synch operation") is made by the end user from the local application on demand or at specific intervals in accordance with application settings.

Existing synching tools; however, have shortcomings. For example, in the context of QuickBooks, there is no known method by which the QuickBooks Web Connector allows a synch operation to be initiated by a Web service on demand. A Web service developer can only specify an interval at which a Web service performs a synchronization operation. Moreover, there is no known method by which a developer can initiate a synch operation from the client computer automatically via programming code. Therefore, if a record is changed on the client computer there is no practical way to notify the Web service that the record has changed.

Thus, there remains a need for improved methods and systems of synchronizing accounting data between a client and server.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
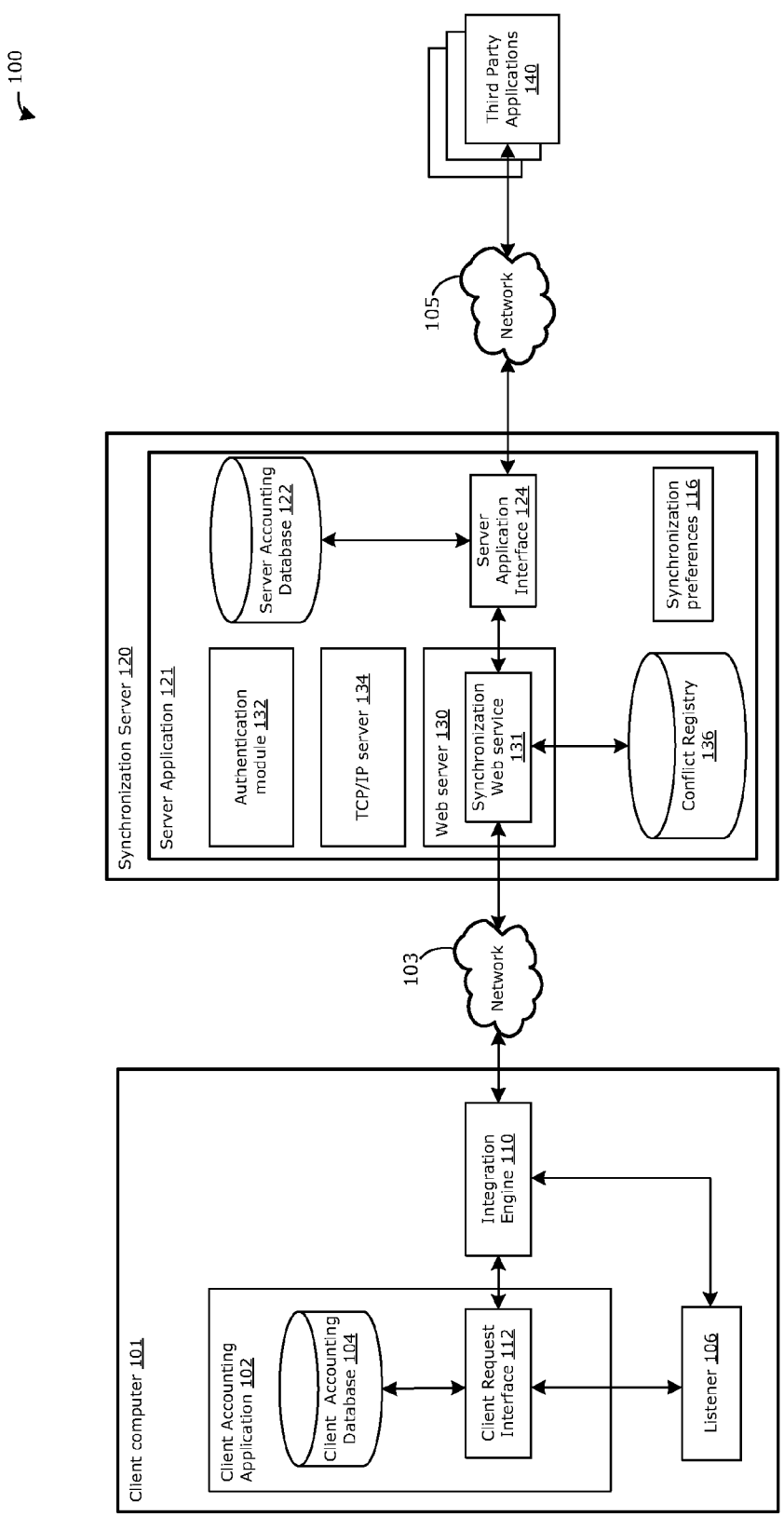
FIG. 1 is a block diagram illustrating a synchronization system in accordance with one embodiment of the present disclosure.

The present disclosure provides a method and system for performing synchronization between a client accounting database on a client computer and a remote client accounting database maintained by a server. The synchronization occurs in real-time in at least some embodiments. The synchronization takes into account changes in the client accounting database on the client computer and client accounting database on the server in accordance with applicable accounting rules such as, for example, Generally Accepted Accounting Principles (GAAP).

In accordance with one embodiment, there is provided a system and method for transferring and maintaining data replicated from a client accounting software's database to a database on a remote Web-server. The system extracts database records from the accounting software's database, and transfers them, via a Web service, to a remote database. Web-based applications, either using a direct database connection, or via a Web service, can then add and edit records on the remote Web-server as well as mark them for deletion. These changes then get synchronized to the client accounting software's database. Similarly, when records are added, edited and deleted on the client accounting software's database the changes are reflected, via a Web service, on the remote database. Synchronization can either be initiated manually, at timed intervals, or in real-time using a TCP/IP (Transmission Control Protocol/Internet Protocol) connection or other suitable type of connection.

In at least some embodiments, the synchronization system of the present disclosure has the following properties: it transfers records from the client database to the remote server database and maintains database relationships between records; it transfers records from the remote server database to the client database and ensures that the format is correct depending on the version of the client accounting software; it make entries in either the client or server database when the connection between the two is broken for whatever reason; it handles conflict resolution when records are changed on both the client and the remote database before synching; it takes into account that records need to be entered in a specific order so as to maintain dependency between records and to conform to accounting rules (for example, an invoice record cannot be entered before the named customer record has been entered); it maintains an error list or conflict resolution list that users can have access to in order to resolve problems; and it has a mechanism for changes that occur on the remote server to alert the client to process the changes, in real-time, without waiting for a timed-interval synch.

The method and synchronization system of the present disclosure shares the processing and business logic burden between the client computer and server. This reduces the bandwidth consumed by sending and receiving data and reduces the processing performed on the server compared with other synchronization techniques in which all business logic, such as analyzing and determining which records require synchronization, is performed by the Web service. This may also increase the efficiency and accuracy of synchronization compared with other synchronization techniques.

In accordance with another embodiment, there is provided a method for use on a server of synchronizing data between a client accounting database on a client computer and the server accounting database on the server, the client computer and server being connected over a communication network by a persistent connection, each of the client accounting database and server accounting database comprising a number of tables, wherein accounting objects are defined by a group of one or more related records in one or more tables in the client accounting database and server accounting database, the method comprising: detecting one or more records in the server accounting database which have changed since a previous synchronization; identifying one or more accounting objects to be synchronized in accordance with the one or more changed records; and sending instructions to the client computer to synchronize the one or more accounting objects defined by the one or more changed records in the server accounting database with the client accounting database, wherein the one or more accounting objects are synchronized in accordance with a synching order defining an order in which accounting objects are synchronized.

In accordance with a further embodiment, there is provided a method for use on a client computer of synchronizing data between a client accounting database on the client computer and a server accounting database on a server, the client computer and server being connected over a communication network by a persistent connection, each of the client accounting database and server accounting database comprising a number of tables, wherein accounting objects are defined by a group of one or more related records in one or more tables in the client accounting database and server accounting database, the method comprising: detecting one or more records in the client accounting database which have changed since a previous synchronization; identifying one or more accounting objects to be synchronized in accordance with the one or more changed records; and sending instructions to the server to synchronize the one or more accounting objects defined by the one or more changed records in the client accounting database with the server accounting database, wherein the one or more accounting objects are synchronized in accordance with a synching order defining an order in which accounting objects are synchronized.

In accordance with a further embodiment, there is provided a method of notifying a client computer of a change on a paired server accounting database on a server, the client computer and server being connected over a communication network by a persistent connection, each of the client accounting database and server accounting database comprising a number of tables, wherein accounting objects are defined by a group of one or more related records in one or more tables in the client accounting database and server accounting database, the method comprising: detecting one or more records in the server accounting database which have changed since a previous synchronization; identifying the persistent connection with client computer from the number of persistent connections using identifying information associated with the one or more changed records in server accounting database; and notifying the client computer of the one or more changed records using the persistent connection.

In accordance with a further embodiment of the present disclosure, there is provided a method of synchronizing data between a client accounting database on the client computer and a server accounting database on a server, the client computer and server being connected over a communication network by a persistent connection, each of the client accounting database and server accounting database comprising a number of tables, wherein accounting objects are defined by a group of one or more related records in one or more tables in the client accounting database and server accounting database, the method comprising: identifying one or more accounting objects to be synchronized in accordance with one or more changed records in the client accounting database, server accounting database, or both; sending instructions to the client computer to synchronize the one or more accounting objects defined by any changed records in the server accounting database with the client accounting database; and sending instructions to the server to synchronize the one or more accounting objects defined by any changed records in the client accounting database with the server accounting database; wherein the one or more accounting objects are synchronized in accordance with a synching order defining an order in which accounting objects are synchronized.

In accordance with a further embodiment of the present disclosure, there is provided a method of synchronizing data between a client accounting database on the client computer and a server accounting database on a server, the client computer and server being connected over a communication network by a persistent connection, each of the client accounting database and server accounting database comprising a number of tables, wherein accounting objects are defined by a group of one or more related records in one or more tables in the client accounting database and server accounting database, the method comprising: determining records in the client accounting database which have changed since a previous synchronization; identifying one or more accounting objects to be synchronized in accordance with any changed records in the client accounting database, server accounting database, or both; sending instructions to the client computer to synchronize one or more accounting objects defined by any changed records in the server accounting database with the client accounting database; and sending instructions to the server to synchronize one or more accounting objects defined by any changed records in the client accounting database with the server accounting database; wherein the one or more accounting objects are synchronized in accordance with a synching order defining an order in which accounting objects are synchronized.

In accordance with further embodiments of the present disclosure, there are provided a computer program products comprising a computer readable medium having stored thereon computer program instructions for implementing on a client computer the methods of synchronizing accounting objects as set forth herein, and a computer readable medium having stored thereon computer program instructions for implementing on a server computer the methods of synchronizing accounting objects as set forth herein.

Referring to FIG. 1, a synchronization system 100 in accordance with one embodiment of the present disclosure will now be described. The system 100 comprises one or more client computers 101 (one of which is shown in FIG. 1) which can connect to a synchronization server 120 over a communication network 103 such as the Internet. The synchronization server 120 also connects to third party applications 140 on a remote server (not shown) over a communication network 105 such as, for example, the Internet. Each client computer 101 includes among the various software modules stored in its memory, an accounting software module for executing an accounting software application 102 such as, for example, QuickBooks®.

The accounting application 102 maintains at least one client accounting database 104 which comprises a number of accounting objects defined by one or more records in one or more tables. The accounting application 102 may maintain more than one client accounting database 104 in some embodiments. Each table is made up of a series of rows and columns in which each row represents a record and the columns represent fields in those records. The end user interacts with the client accounting database 104 indirectly using the graphical user interface (GUI) provided by the accounting application 102. Each record has a modification date representing the date it was last modified and typically also includes the time at which the record was last modified. The modification date is provided comprising a field in the respective record.

The client computers 101 have a listener 106, an integration engine 110 and client request interface 112. The listener 106 and integration engine 110 may be separate applications, or may be part of the client accounting application 102. The client request interface 112 is typically part of the client accounting application 102 but could be a separate application.

The synchronization server 120 implements a server application 121 that maintains at least one server accounting database 122. The server application 121 may maintain more than one server accounting database 122 in some embodiments. Each server accounting database 122 comprises a synchronized copy of at least of the database accounting objects in the client accounting database 104 of one or more client computers 101, possibly a synchronized copy of all the accounting objects in the client accounting database 104 of one or more client computers 101. In an example use case, a server accounting database 122 may be maintained by a franchiser and may comprise a copy of the records of the client accounting databases 104 of a number of franchisees or a subset of those records. In such cases, each of these client computers 101 may have the same or different version of the accounting application 102 in which case capabilities of the different versions may need to be taken into account.

The server application 121 comprises a number of software modules for performing various functions, comprising a Web server 130 for providing a Web service, an authentication module 132 for providing authentication of user accounts and/or client computers 101, a TCP/IP (transmission control protocol/Internet protocol) server 134 for providing TCP/IP connectivity for client computers to connect to, a server application interface 124 for interacting with third party applications 140, and a conflicts registry 136 for storing conflicts which occur during synchronization operations. Each of these modules will be described in more detail below. The server modules may be realized as a plurality of independent elements or some of the server modules may be combined. Moreover, one or more of the server modules may be implemented as part of other software modules. The server modules could be implemented using separate servers or server applications which are connected to the synchronization server 120. Synchronization preferences 116 are stored on the synchronization server 120 for access by the server application interface 124 and integration engine 110. The synchronization preferences 116 specify synchronization preferences including which transaction objects to synchronize, the last synchronization date, and preferences for conflict resolution (e.g., client application 101, synchronization server 120, or last modified wins when a conflict occurs). The synchronization preferences 116 could also be stored on the client computer 101 in addition to, or instead of, the synchronization server 120.

The server application 121 implements a synchronization Web service 131, typically via the Web server 130. The primary functions of the synchronization Web service 131 is to build XML files based on records in the server accounting database 122, provide the XML files to the integration engine 110 during synchronization operations, receive XML files from the integration engine 110 during synchronization operations, analyze the contents of XML files received from the integration engine 110, and update the relevant records in the server accounting database 122. In at least some embodiments, each accounting object is defined by a separate XML file which includes a complete set of records which make up that accounting object. In other embodiments, a different exchange interface other than XML may be used. This could, for example, a COM object option as a layer on top of the XML interface or something else. The different exchange interface may be used to accommodate the abilities of the client accounting application 102 or to improve the functionality of the server 120, for example, to improve the functionality with third party applications 140. The purpose of the synchronization Web service 131 is to keep the server accounting database 122 up-to-date with changes that occur in the client accounting database 104. The server accounting database 122 can be single-tenant (one server database for every client accounting database 104) or multi-tenant (one server database used to share the data from multiple client accounting databases 104), depending on the embodiment.

Third party applications 140 can access and interact with the server accounting database 122, via the Server Application Interface 124, instead of the client database 104 on client computers 101 and without having to use the software developer's kit (SDK) for the accounting software product. Using the paired server accounting database 122 rather than the client accounting database 104 on the client computer 101 eliminating the delays caused by exchanging data between the server or other computer running the third party application and the client computer 101, and eliminating the delays caused by waiting for data to be validated by the accounting application 102. Moreover, the provision of copies of the accounting objects in the paired server accounting database 122 obviates the need for the accounting application 102 to be connected to the third party applications 140 or server 120 to write and read data. Instead, third party applications can read and write data to the server accounting database 122 and any changes are synchronized with the client accounting database 104 when it reconnects to the system 100. It will be appreciated that, while not shown, the third party applications 140 could also interface directly with the accounting application 102 on the client computers 101, typically via the client request interface 112, but such communications are not related to the synchronization methods of the present disclosure.

Database Structure

The client accounting database 104 and server accounting database 122 typically have the same or substantially similar database schema. The databases 104, 122 are relational databases in at least some embodiments. This typically requires the use of the same accounting application product or platform on the client computers 101 and complementary server-side applications which are capable of interpreting the database schema of the accounting application product or platform on the client computers 101. However, database records could be transcoded or transformed when copying records from a client accounting database 104 having records defined in accordance with a first database schema and a server accounting database 122 having records defined in accordance with a second database schema, and vice versa.

Typically, differences between the database schema exist because the client accounting database 104 uses an older version of the database schema used by the server accounting database 122. This may occur because the client accounting application 102 is an older version, and the server 120 is supporting other, newer client accounting applications 102 having a "newer" database schema. Differences between database schemas of different versions are typically new field support and new field names for logically equivalent supported fields. The server 120 maintains information about the accounting objects and tables supported by the client accounting application 102 including the fields which are required fields to satisfy the supported accounting object definitions.

In some embodiments, if the field exists in the server accounting database 122 but not in the client accounting database 104 the field is ignored when synching. However, if the field exists in the client accounting database 104, and is exposed by the client request interface 112 it is always synchronized with the server accounting database 122. If one or more field of an older database schema on the client computer 101 have been replaced with similar field(s) in newer versions of the data schema, the synchronization system 100, in at least some instances, uses a common field convention on the server accounting database 122 and translate between the different fields in the server application interface 124 from the common field convention to the different database schema of different client accounting applications 102 on different client computers 101.

In some embodiments, the accounting application 102 is QuickBooks and the client accounting database 104 is a QuickBooks database. In such embodiments, the client accounting database 104 and server accounting database 122 and respective accounting objects, tables and records are defined in accordance with the QuickBooks database schema, and the client accounting database 104 and server accounting database 122 may be QuickBooks (QB) database files (e.g., QB files). The QuickBooks database schema is known in the art.

The accounting objects are independent, dependent, conditionally dependent, or interdependent. Each object and each table is associated with a flag or other identifier (ID) which identifies its dependency type. For each table, this relation is stored as a mapping separate from the table itself which associates the table by a table identifier (ID) with its respective table dependency flag. These mappings/relations conform to the requirements of the SDK or API of the client accounting application 102 and are stored on the client computer 101 and possibly the server 120.

An independent object does not comprise any fields that are linked to records in tables of other objects. A dependent object comprises one or more fields that link to one or more records in one or more tables of other objects. The tables which are linked to may be tables in independent or dependent objects. A single dependent object depends on one or more tables in independent objects. A multiply dependent object depends on one or more tables in dependent objects. A conditionally dependent object can be independent or dependent depending on the particular table and its relationships with tables in other objects.

An interdependent object comprises one or more fields that link to one or more records in one or more tables in other objects, and in turn these tables have fields that link back to that same table. The tables which are linked to may be tables in independent or dependent objects, and the tables that are linked from are tables in dependent objects. For convenience, a dependency relationship in which fields in a table link to records in other tables will be referred to as a "backward dependency", and a dependency relationship in which records link to by fields in other tables will be referred to as a "forward dependency".

The objects are either list objects comprising records from list tables or transaction objects comprising transaction records from transaction tables. List records are independent or dependent on any list record. However, every transaction record is dependent on at least one or more list record.

List objects comprise a number of records defined by tables such as an "Inventory Items" table, "Account Type" table and "Customer" table. Transaction objects comprise a number of records defined by transaction tables such as an "Inventory Adjustment" table, "Journal Entry" table and "Invoice" table. Transaction objects typically provide a historic tracking of each activity that affects and consumes list records.

In some embodiments, each record is identified in the server accounting database 122 using a "RecordID" field that is unique within each table (each having a unique table name). Each record in the client accounting database 104 is assigned a "ListID" (for list records) or a "TxnID" (for transaction records). The ListID and TxnID are unique across all records in all tables in the client accounting database 104. The ListID and TxnID are stored in the server accounting 122 database so that the corresponding record in the client accounting database 104 can be determined. The ListID and TxnID cannot be used as the unique value in the server accounting database 122 because the client accounting database 104 and server account database 122 can exist in a disconnected state and each record in the server accounting database 122 must have a unique identifier in the disconnected state so that it can be referenced by another table or updated (e.g., records can be added to the server accounting database 122 in the disconnected state by third party applicators 140, etc.). As a result, the tables on the server accounting database 122 reference each other using the RecordID field because it is available and has a unique value in all circumstances.

The dependency type of the accounting objects in accordance with one embodiment of the present disclosure will now be described. In this example embodiment, the accounting application 102 is QuickBooks and the objects and tables correspond to those available in QuickBooks version 2008. In this example embodiment, the independent "list" objects comprise the following accounting objects: Company; DataExtDef; UnitOfMeasureSet; ShipMethod; Vehicle; ToDo; PaymentMethod; VendorType; Class; Terms; CustomerMsg; CustomerType; and JobType. In this example embodiment, the dependent "list" accounting objects comprise the following accounting objects: Preferences. The interdependent "list" accounting objects comprise the following accounting objects: Account; PayrollItemWage; PayrollItemNonWage; Item; BillingRate; SalesTaxCode; PriceLevel; Entity; and SalesRep.

In this example embodiment, there are no independent "transaction" accounting objects; however, it is possible that "transaction" accounting objects exist in other embodiments. The dependent "transaction" accounting objects comprise the following accounting objects: Charge; TimeTracking; VehicleMileage; JournalEntry; InventoryAdjustment; Estimate; ReceivePayment; Deposit; Invoice; CreditMemo; Bill; VendorCredit; SalesOrder; PurchaseOrder; ItemReceipt; Check; ARRefundCreditCard; BillPaymentCheck; BillPaymentCreditCard; CreditCardCharge; CreditCardCredit; SalesReceipt; and BuildAssembly.

The content and function of the foregoing accounting objects and tables will be readily understood by persons ordinarily skilled in the art. Moreover, additional and different accounting objects and tables will be readily understood by persons skilled in the art. The teachings of the present disclosure apply equally to such additional and different accounting objects and tables.

In view of the above, it will be understood that the client accounting database 104 and the server accounting database 122 each comprise a number of tables. At least some of the tables in each of the client accounting database 104 and the server accounting database 122 define accounting objects. An accounting object is a logical object defined by a group of one or more related records in one or more tables in one of an accounting database 104 or 122. The relationships between the records are based one or more dependencies, one or more business accounting logic rules, or a combination thereof.

An example of an accounting object is a Bill payable to a vendor. A Bill object is comprised of a single record in the Bill table which contains the transaction date, accounts payable account number, and the vendor that the bill is payable to. The Bill object is also comprised of 0 to many bill expense line records from the BillLineExpense table, and 0 to many bill item records from the BillLineItem table. Thus, a Bill object is defined by one or more records in one or more of the Bill table, BillLineExpense table and BillLineItem table.

Accounting objects each belong to one of a number of predetermined categories which, in at least some embodiments, comprise the following categories: (1) independent list objects (e.g., Company, Currency, Classes and Customer Type); (2) dependent list objects (e.g., Items, Customers and Vendors); (3) all other transaction objects which do not affect Accounts Receivable or Accounts Payable (e.g., Time Tracking, Bank Transfers); (4) transaction objects that debit Accounts Receivable (e.g., Invoices, Statement Charges, and Sales Receipts); (5) transactions objects that credit Accounts Receivable (e.g., Receive Payments, Credit Memos); (6) transactions objects that credit Accounts Payable (e.g., Bills and Item Receipts); and (7) transactions objects that debit Accounts Payable (e.g., Bill Payments and Checks).

It will be appreciated that in some embodiments Accounts Receivable may be a single record in the Accounts table called "Accounts Receivable" which has the AccountType of "AccountsReceivable". However, in other embodiments Accounts Receivable could comprise multiple records each with different names but all having the AccountType of "AccountsReceivable". Similarly, in some embodiments Accounts Payable may be a single record in the Accounts table called "Accounts Payable" which has the AccountType of "AccountsPayable". However, in other embodiments Accounts Payable could comprise multiple records each with different names but all having the AccountType of "AccountsPayable".

In some embodiments, including those in which the client accounting application 102 is implemented using QuickBooks version 2008, the predetermined categories described above are comprised of the following accounting objects defined records in the following tables:

(1) Independent List Objects

| Object | Tables |
| --- | --- |
| Company | Company |
| BillingRate | BillingRate |
|  | BillingRatePerItemRetList |
| Class | Class |
| CustomerMsg | CustomerMsg |
| CustomerType | CustomerType |
| DataExtDef | DataExtDef |
| JobType | JobType |
| PaymentMethod | PaymentMethod |
| PriceLevel | PriceLevel |
|  | PriceLevelPerItemRetList |
| ShipMethod | ShipMethod |
| Terms | Terms |
| ToDo | ToDo |
| UnitOfMeasureSet | UnitOfMeasureSet |
|  | UnitOfMeasureRelatedUnit |
| Vehicle | Vehicle |
| VendorType | VendorType |

(2) Dependent List Objects

| Object | Tables |
| --- | --- |
| Account | Account |
| Entity | Entity |
|  | EmployeeEarningsRetList |
| Item | ItemGroupOrAssemblyList |
| PayrollItemNonWage | PayrollItemNonWage |
| PayrollItemWage | PayrollItemWage |
| Preferences | Preferences |
| SalesRep | SalesRep |
| SalesTaxCode | SalesTaxCode |

(3) Transaction Objects that do not Affect Accounts Receivable or Accounts Payable

| Object | Tables |
| --- | --- |
| BuildAssembly | BuildAssembly |
|  | BuildAssemblyLineItem |
| Deposit | Deposit |
|  | DepositLine |
| InventoryAdjustment | InventoryAdjustment |
|  | InventoryAdjustmentLine |
| Estimate | Estimate |
|  | EstimateLine |
| JournalEntry | JournalEntry |
|  | JournalEntryLine |
| PurchaseOrder | PurchaseOrder |
|  | PurchaseOrderLine |
| SalesOrder | SalesOrderLine |
| TimeTracking | TimeTracking |
| VehicleMileage | VehicleMileage |

(4) Transaction Objects that Debit Accounts Receivable

| Object | Tables |
| --- | --- |
| Charge | Charge |
| Invoice | Invoice |
|  | InvoiceLine |
| SalesReceipt | SalesReceiptLine |

(5) Transactions Objects that Credit Accounts Receivable

| Object | Tables |
| --- | --- |
| ARRefundCreditCard | ARRefundCreditCard |
|  | ARRefundCreditCardAppliedToTxn |
| CreditMemo | CreditMemo |
|  | CreditMemoLine |
| ReceivePayment | ReceivePayment |
|  | ReceivePaymentAppliedToTxn |

(6) Transactions Objects that Credit Accounts Payable

| Object | Tables |
| --- | --- |
| Bill | Bill |
|  | BillLineExpense |
|  | BillLineItem |
| Check | Check |
|  | CheckLineExpense |
|  | CheckLineItem |
| CreditCardCharge | CreditCardCharge |
|  | CreditCardChargeLineExpense |
|  | CreditCardChargeLineItem |
| ItemReceipt | ItemReceipt |
|  | ItemReceiptLineExpense |
|  | ItemReceiptLineItem |

(7) Transactions Objects that Debit Accounts Payable

| Object | Tables |
| --- | --- |
| BillPaymentCheck | BillPaymentCheck |
|  | BillPaymentCheckAppliedToTxn |
| BillPaymentCreditCard | BillPaymentCreditCard |
|  | BillPaymentCreditCardAppliedToTxn |
| CreditCardCredit | CreditCardCredit |
|  | CreditCardCreditLineExpense |
|  | CreditCardCreditLineItem |
| VendorCredit | VendorCredit |
|  | VendorCreditLineExpense |
|  | VendorCreditLineItem |

In the accounting object definitions in the tables above, each accounting object has at least one primary record in a primary table and possibly one or more subsidiary records in subsidiary tables which are dependent on the primary record in the primary table. In the tables above, the primary table is the listed table when the accounting object is defined by a single table or the first list table when the accounting object is defined by more than one table. In at least some embodiments, the accounting objects are defined by XML, typically in the form of individual XML documents. In such embodiments, the integration engine 110 and client request interface 112 on the client computer 101 and the synchronization Web service 131 on the server 120 are configured to identify the accounting object by the XML code defining the respective accounting object. Once an accounting object is identified, a separate function for synchronizing the respective accounting object can be called on the client or server. Each function is provided with the respective accounting object definitions so that it can synchronize that accounting object. In other embodiments, some or all of the synchronizing functions could be combined into one or more larger functions.

The present disclosure provides a method and system of synchronizing the accounting objects in the client accounting database 104 with the corresponding accounting objects in the server accounting database 122, and vice versa. The present disclosure preserves, or at least attempts to preserve, the integrity of the accounting objects.

The integrity of accounting objects is maintained by synching the accounting objects in an order which preserves the relationships between the records. This order is referred to as the synching order for convenience. The relationships which define the accounting objects are: dependencies between records, business accounting logic rules, or a combination thereof. The synching order is typically predetermined and stored by the server 120 and client computer 101, but could be determined in real-time prior to synchronization in other embodiments.

The dependency relationships between one or more records in one or more tables are defined by the related records. The links define the value of one or more fields in the related records or provide a basis for calculating the value of one or more fields in the related records. The number of dependency relationships is typically quite large. In a typical implementation, the number of dependency relationships could number in the hundreds or more. The synching order is typically defined to preserve the logical relationships of the business accounting logic rules while minimizing the number of loops required to resolve conditionally dependent and interdependent records. Accordingly, the synching order is defined so that records are synchronized before other records that depend on fields in those records are synchronized.

The accounting business logic rules define predetermined mappings between one or more records in one or more tables in accordance with logical relationships between the one or more records based on business accounting rules which, for example, could be logical relationships based on Generally Accepted Accounting Principles (GAAP). The synching order is defined so as to preserve the logical relationships of the business accounting logic rules. The logical relationships are not merely dependencies. The predetermined mappings may operate on records or fields which may or may not have dependency relationships, depending on the accounting object and its related records. The number of predetermined mappings is typically quite large as within the dependency relationships. In a typical implementation, the number of predetermined mappings could number in the hundreds or more.

To maintain the integrity of accounting objects, each category of accounting object is synchronized in a predetermined order before the next category can be synchronized. The synching order defines the order in which the categories of accounting objects are synchronized so that accounting objects defined by one or more records in one or more tables are synchronized in accordance with a category of the respective accounting objects.

In addition, when synching a particular type of accounting object, each accounting object must be synchronized completely or not all. That is, either all the records that make up the accounting object are synchronized or none of records that make up the object will be synchronized. This preserves the integrity of the accounting objects and the respective dependencies and business logical rules of such objects. Within each category of accounting object, accounting objects may be synchronized in order (e.g. in series) or possibly in parallel depending on the dependencies affecting the particular accounting objects. Typically, the accounting objects in each category are synchronized in series to minimize potential conflicts. In some embodiments, a synching order may be defined for each category of accounting objects for synching accounting objects within each category.

In at least some embodiments, the each category of accounting object is synchronized in the following order:
1. Independent list objects (e.g., Company, Classes and Customer Type).
2. Dependent list objects (e.g., Items, Customers and Vendors). Within dependent list objects, objects are preferably synchronized in an order which reduces or minimize conflicts requiring multiple-loops. The exact order may vary based on the version and/or accounting program.
3. Transaction objects that do not affect Accounts Receivable or Accounts Payable (e.g., Time Tracking, Bank Transfers).
4. Transaction objects that debit Accounts Receivable (e.g., Invoices, Statement Charges, and Sales Receipts).
5. Transactions objects that credit Accounts Receivable (e.g., Receive Payments, Credit Memos).
6. Transactions objects that credit Accounts Payable (e.g., Bills and Item Receipts).
7. Transactions objects that debit Accounts Payable (e.g., Bill Payments and Checks).

Within the dependent list objects category and possibly other categories, accounting objects are preferably synchronized in an order which reduces or minimize conflicts requiring multiple loops. The exact order may vary based on the version and/or accounting program.

The synching order may be affected based on the accounting objects supported by the client accounting database 104 (e.g., based on the software version). Typically the server accounting database 122 can support multiple versions of client accounting database 104. Thus, only tables of the supported accounting objects are synchronized in the client accounting database 104. However, it possible that the synching order is also based on the accounting objects supported by the server accounting database 122.

As noted above, every transaction record is dependent on at least one or more list record; however, no list record is dependent on a transaction record. When synching a particular accounting object or category of accounting object, all list objects to be synchronized should be synchronized before transaction objects which depend on them are synchronized to increase efficiency. In some embodiments, all list objects to be synchronized are synchronized before any transaction object is synchronized to increase efficiency. It will be appreciated that, although transaction objects typically have more business accounting logic rules associated with them, list objects may also have business accounting logic rules associated with them.

In some embodiments, when synching a particular accounting object or category of accounting object, all independent objects may be synchronized, followed by all dependent objects in an order in which multiply dependent objects which depend on one or more dependent objects are processed after the objects on which they depend, and lastly interdependent objects are synchronized. This typically involves processing some or all single dependent objects before multiply dependent objects.

In at least some embodiments, each accounting object within a category of accounting objects is synchronized in series. When some of the records in one or more tables are interdependent records having interdependencies between one or more records in two or more tables, the interdependent records are synchronized over a number of change operations (referred to as loops). One or more of the interdependent records are partially synchronized during each of the change operations and the change operations are repeated for the partially synchronized records until all of the interdependent records are fully synchronized. Advantageously, the synching order may be defined so as to minimize the number of change operations required to fully synchronize the interdependent records. In at least some embodiments, interdependent record which are partially synchronized in the change operations are marked with a "temporary" status flag which is removed during subsequent change operations when the respective interdependent records are fully synchronized.

Due to the complexity of interdependent objects, it is necessary to perform two or more loops and only synch part of the object on the first (or initial) loop. For example, the Entity contains customers, vendors and employees. The SalesRep object links to the Entity object for vendors and employees. In turn the Entity object links back to the SalesRep object for sales representatives to be assigned to customers. Therefore, it is necessary to perform multiple loops to resolve interdependencies. When performing multiple loops to resolve interdependencies between interdependent records of interdependent objects, records which contain only partially synchronized data are marked with a "temporary" status flag. When the object is fully synchronized on a subsequent loop, the "temporary" status flag is removed. This prevents incomplete information from being exposed (made available) displayed to the server application interface 124 and third party applications 140 until they have been synchronized. Only fully synchronized records can be viewed. For example, on the first loop the Entity object is synchronized, and a customer "John Smith" is added. Since John Smith has been assigned to a Sales Rep. named "Mike" who is not yet synchronized, John Smith's record is marked with a temporary status flag. The employee "Mike" is then added, during the same loop as an employee in the Entity object. Next, the Sales Rep. "Mike" is created, linking to the employee record in the Entity object. A second loop is then performed, and John Smith is finally assigned to the SaleRep "Mike", who now exists, and the temporary status flag is removed.

The selection of the synching order is important for several reasons. Firstly, the synching order reduces errors and thereby reduces the amount of conflict resolution which is necessary. Interdependent objects require a particular order of processing to reduce the number of rejected entries from the client accounting application 102 when a synch operation is performed from the synchronization server 120 to the client computer 101. Performing the synch in the synching order ensures that certain records are synchronized before other records that depend on those entries are synchronized. For example, for an Invoice, the Entity (Customer) is required. If a new Entity is created and a synch operation is performed on the Invoice record before the Entity record, the client accounting application 102 will generate an error and reject it. A corresponding conflict is then entered in the conflict registry 136 for resolution by the user. However, if the Entity record is synchronized before the Invoice record is synchronized, the record will be accepted.

Secondly, the synching order enforces business accounting logic rules. Some situations of interdependent objects will not generate an error. Instead there will be a break in the business accounting logic rules and a break with the intentions of the end user and the underlying business accounting logic. Some objects are conditionally dependent in that they can be independent or dependent, depending on the situation. The synching order is structured such that in situations of conditional dependency, business accounting logic rules are preserved. For example, synching an invoice before synching an associated payment will ensure that the payment is applied to the invoice. However, synching the payment first and the invoice second will result in an unpaid invoice (increasing Assets on the balance sheet), and outstanding "accounting credit" (increasing Equity on the balance sheet). No errors will be raised if the payment is synchronized first, but the actual intention of the user will not be honored, and there will be undesired effects on the financial statements of the company using the synching system.

Thirdly, the synching order minimizes the duration of synch operations, bandwidth, and processing requirements. Efficient ordering reduces the total number of records that get marked with a "temporary" status flag, thereby reducing the number of times the same record must be synchronized, and reducing the number of loops the synching process must go through. Therefore, efficient ordering results in a shorter synch duration (time), less server and client bandwidth usage, and less server and client processing (less demand on the microprocessors 202, 302).

In one example embodiment, to maintain their integrity, accounting objects are synchronized in the following order: Company; DataExtDef; UnitOfMeasureSet; Account; ShipMethod; Preferences; Vehicle; ToDo; PaymentMethod; VendorType; Class; PayrollItemWage; PayrollItemNonWage; Terms; CustomerMsg; CustomerType; JobType; Item; BillingRate; SalesTaxCode; PriceLevel; Entity; SalesRep; TimeTracking; VehicleMileage; Deposit; BuildAssembly; PurchaseOrder; SalesOrder; Estimate; InventoryAdjustment; JournalEntry; Charge; Invoice; SalesReceipt; CreditMemo; ARRefundCreditCard; ReceivePayment; Bill; CreditCardCharge; ItemReceipt; Check; CreditCardCredit; VendorCredit; BillPaymentCheck; and BillPaymentCreditCard. It will be appreciated that different synching orders which also respect the object dependencies and business accounting logic rules are possible.

The integration engine 110 of the client computer 101 and the synchronization Web service 131 of synchronization server 120 connect over the network 103 in a secure manner, typically using Hypertext Transfer Protocol over Secure Socket Layer (HTTPS). Similarly, the server application interface 124 of server application 121 and the third party applications 140 connect over the network 105 in a secure manner, typically using HTTPS. Other suitable methods of secure connection could be used in other embodiments.

As noted above, the server accounting database 122 provides a paired database structure which holds a synchronized copy of at least some of the accounting objects in the client accounting database 104 (e.g. QuickBooks accounting data). The server accounting database 122 can be accessed and interacted with using the server application interface 124 by external or "third party" applications 140. Third party applications 140 may view (read), edit, add and delete records on the server accounting database 122 depending on the rights associated with the respective third party application 140 and the attributes associated with the respective accounting object, table or record in the server accounting database 122. Example third party applications 140 could be scheduling applications, reporting applications, payroll tracking applications, CRM (Customer Relationship Management), ERP (Enterprise Resource Planning), business management systems, etc.

Both the server application 121 and third party applications 140 apply business accounting logic rules to the server accounting database 122 when making changes. In the case of third party applications 140, business accounting logic rules is applied to data obtained from the server accounting database 122 applies business accounting logic rules before sending a change request to the server application interface 124 which then passes on the request to a client request interface 112 on the client computer 101. However, it is the business accounting logic rules of the client accounting application 102 that governs both the client accounting database 104 and the server accounting database 122. Because there be additional accounting rules and data that are hidden from the server application 121 and third party applications 140, they can only make a "best effort" by applying as much of the business accounting logic rules as possible (i.e., applying all the known (or exposed) business accounting logic rules). However, the client request interface 112 finally determines whether a change made to the server accounting database 122 complies with the business accounting logic rules of the client accounting application 102 and client accounting database 104.

Because the client request interface 112 has to approve all server-side changes to the server accounting database 122, all server-side changes may be considered "pending" until approved by the client request interface 112. However, the converse is not true. That is, the server application 121 and third party applications 140 do not have to approve client-side changes to client accounting database 104.

Because the business accounting logic rules of the client accounting application 102 and client accounting database 104 needs to be maintained, client-side changes to the to client accounting database 104 need to be processed (e.g. synchronized) differently from server-side changes to the server accounting database 122 because the client accounting application 102 has the final say on data acceptance or refusal of a server-side change (e.g., additions, deletions or modifications). This also supports greater flexibility regarding adding, querying and editing records on the server accounting database 122 than on the client accounting database 104.

The client request interface 112 provides an interpreter/interface layer between the client accounting database 104 and other applications such as the third party applications 140 and the synchronization Web service 131. The client request interface 112 is part of the SDK of the client accounting application 102 in some embodiments, but could be part of an application programming interface (API) of the client accounting application 102 in other embodiments. In embodiments in which the client accounting application 102 is QuickBooks, client request interface 112 is the QuickBooks SDK. The client request interface 112 receives requests from other applications, processes such requests, and sends responses to the respective requesting response to a request to change a record in the client accounting database 104, the client request interface 112 updates the client accounting database 104 and returns a response to the requesting application regarding the success or failure of the change operation.

The client request interface 112 is optional and is not required in embodiments in which other applications are provided sufficient direct access to the client accounting database 104. This may depend on the particular accounting software and its architecture, for example Microsoft Small Business Accounting™ does not comprise nor require a client request interface 112 allowing other application to directly access the client accounting database 104. In some embodiments, other applications may communicate directly with the client accounting database 104 for some functions or operations, and indirectly by using the client request interface 112 for some functions or operations.

The accounting application 102 interfaces with the integration engine 110 via the client request interface 112. The integration engine 110 is a local application on the client computer 101 which communicates with the synchronization Web service 131 of the synchronization server 120 and the client request interface 112 during synchronization, typically via a TCP/IP connection with the synchronization server 120 although other connections could be used in other embodiments. Other types of connections may be used instead of TCP/IP connection in other embodiments. A suitable alternative connection should maintain a persistent connection between the client computer 101 and server 120, preferably without requiring a constant data stream between the client computer 101 and server 120, or a timer could be used to check for changes at a predetermined interval, for example, every 30 seconds. While functional, a timer uses more bandwidth and requires more server side processing than real-time synching. In yet other embodiments, for example when the client request interface 112 is not present, the client accounting application 102 directly interfaces with the integration engine 110.

As noted above, third party applications 140 may read, edit and add records on the server accounting database 122 depending on the rights associated with the respective third party application and the attributes associated with the respective object, table or record in the server database 122. The synchronization system 100 allows third party applications 140 to write data without having to be validated by the client accounting application 102, accepted and saved. In contrast, validation is performed by the server application interface 124. If there are any validation errors, these are reported to the third party applications 140. An entry is then added to the conflicts registry 136 with a description of the error and, when possible, a recommended action as to how to solve the respective validation error. A recommended action may be selected from one or more predetermined corrective actions based on the respective validation error, when available.

The server application 121 also comprises an authentication module 132 which maintains a list of valid user accounts including user identifiers (user ID) or user names and associated passwords or passcodes. In the case of a multi-tenant server accounting database 122 in which the server accounting database 122 comprises records of multiple client accounting database 104, a tenant identifier (tenant ID) associated with the respective user name and password. The primary function of the authentication server 132 is to validate users and user accounts, to maintain the current public IP address and port of the client computer's connection to the TCP/IP server 134, and to direct the synchronization Web service 131 to the respective server accounting database 122.

The server application 121 also provides a server application interface 124. The server application interface 124 is an application layer interface which writes changes to the server accounting database 122 in response to requests from third party applications 140 (such as third party Web applications). The changes can be written either directly via a Web application that has access to the server accounting database 122, or via a Web service, typically accessed remotely. The server application interface 124 acts as a listener which monitors for changes in the server accounting database 122, and notifies the integration engine 110 either via synchronization with the Web service 131 or in real-time using the TCP/IP server 134 that changes have occurred in the server accounting database 122 which require updating.

When a change is made by the server application interface 124 to the server accounting database 122 which warrants an update to the client accounting database 104, the server application interface 124 notifies the TCP/IP server 134 to initiate a TCP/IP call to the integration engine 110. Since there may be many integration engines 110 sharing a synchronization server 120, the TCP/IP server 134 may have to locate the corresponding client computer 101 and integration engine 110 prior to establishing the TCP/IP connection or using an established TCP/IP connection. The authentication module 132 identifies the corresponding client computer 101 as described above. The synchronization Web service 131 notifies the corresponding integration engine 110 of the changes which are required to the client accounting database 104. The integration engine 110 can then initiate real-time synchronization.

The server application 121 also maintains a conflict registry 136 which comprises a list of all outstanding synchronization issues that need to be resolved by the user of the client accounting database 104 or by third party applications 140, depending on the nature of the conflict. Conflicts can occur when a user changes a record in the client accounting database 104 or a third party application 140 changes a record in the server accounting database 122 when the two are not connected to each other, i.e. when TCP/IP connection is lost. A conflict may also occur because the client request interface 112 may reject a request to change the contents of the client accounting database 104, for whatever reason, necessitating resolution by the user. A change may be rejected for a number of reasons, including that the changed record is missing required fields, duplication of records, or breaking of business accounting logic rules (such as, for example, causing a customer's credit limit to be exceeded). Conflicts in the conflict registry 136 are resolved at the next synchronization operation.

A conflict may occur because the requested change violated one or more of a number of dependencies relationships and/or business accounting logic rules. In some embodiments, records must conform to the following general rules: each numeric field has a maximum and minimum value (some fields cannot be negative); each text fields has a maximum number of characters; each date field has a maximum or minimum value; transactions each have a total maximum and minimum value (some transactions cannot be negative, and often cannot be zero); some transactions must have both negative and positive parts that total up to 0 (e.g., Journal Entries); some fields are required only in situations where other data has been entered into other fields in that record (e.g., a credit card expiry date is only required if there is a credit card number); some records (list and transactions alike) have a minimum and maximum number of detail lines (most transactions have a list of records that belong to it, such as, for example an itemized list of food and drinks bought on a single receipt at a restaurant); and some fields have a limited type of acceptable values based on the input of other fields for that record (e.g., if a journal entry specifies an Accounts Receivable account, a Customer must be also chosen but an Employee could not be chosen instead).

Client Computer

Figure 2:
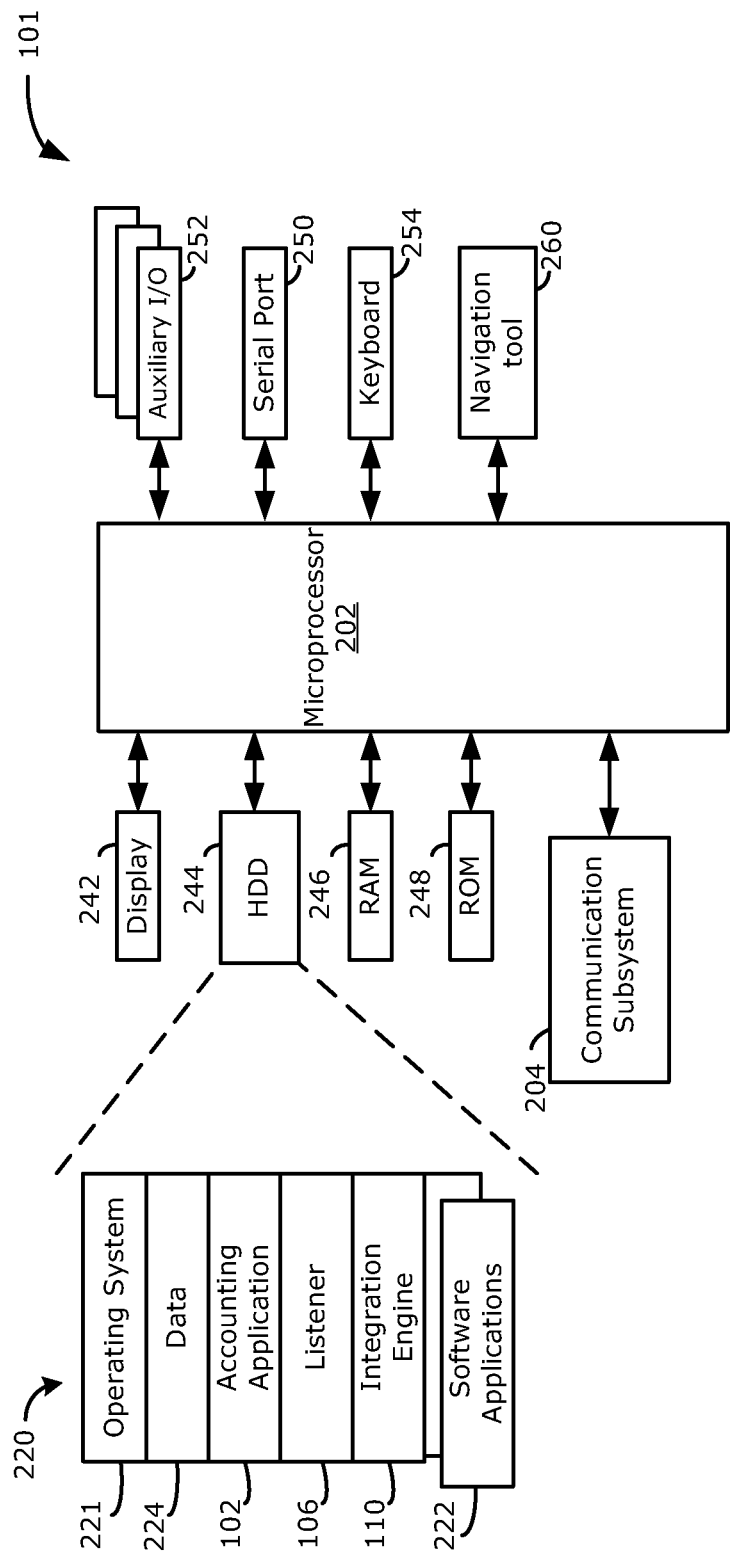
FIG. 2 is a block diagram illustrating a client computer in accordance with one embodiment of the present disclosure.

Reference is next made to FIG. 2 which shows in block diagram form a client computer 101 in accordance with one embodiment of the present disclosure. The client computer 101 comprises a controller comprising at least one processor 202 (such as a microprocessor) for controlling its overall operation connected to a circuit board (not shown) to which other components are connected. The client computer 101 also comprises a communication subsystem 204, such as an Ethernet connection or modem, for performing communication functions and providing access to the communication network 103 (e.g., Internet) including at least TCP/IP connectivity and possibly Hypertext Transfer Protocol (HTTP) connectivity. The computer 101 may also comprise or be connected to a firewall (not shown) in which case the firewall should be set to allow remote TCP/IP connections generally, or to allow remote TCP/IP connections from the synchronization server 120 specifically (potentially blocking other remote TCP/IP connections).

The client computer 101 also comprises a display screen 242 or monitor connected to the processor 202, one or more user input devices such as a keyboard 254 and navigation tool 260 (such as a mouse) connected to the processor 202 for sending user input signals to the processor 202 in response to user inputs, one or more memories or electronic storage elements connected to the processor 202 such as a hard disk drive (HDD) 244 or other non-volatile memory such as flash memory, random access memory (RAM) 246, and read only memory (ROM) 248. The client computer 101 may also comprise a data port 250 such as serial data port (for example, a Universal Serial Bus (USB) data port) and auxiliary input/output (I/O) devices 252.

The processor 202 operates under stored program control and executes software modules 220 stored in memory such as persistent memory, for example, in the HDD 244. The software modules 220 comprise operating system software 221, data 224, the accounting application 102 including one or more accounting databases 104, client request interface 112, listener 106, integration engine 110, and other software applications 230. Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The listener 106 and integration engine 110 may, among other things, be stand-alone software applications, part of the operating system 221, or part of the accounting application 102 (for example, an "add-on" or "plug-in" to the accounting application 102) or other software application 230. In some embodiments, the functions performed by the listener 106 and the integration engine 110 may each be realized as a plurality of independent elements rather than single elements, and any one or more of these elements may be implemented as part of other software modules.

Synchronization Server

Figure 3:
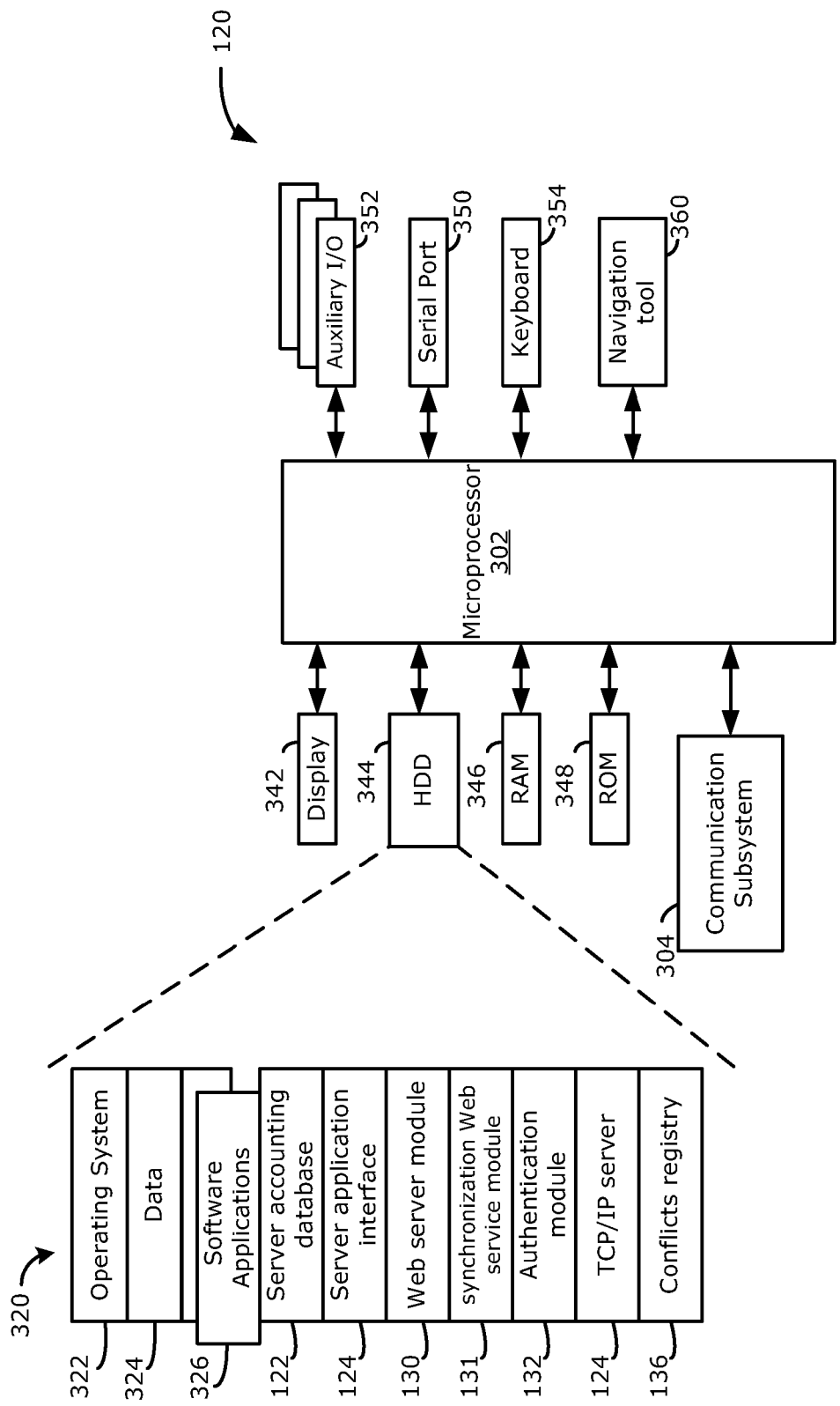
FIG. 3 is a block diagram illustrating a synchronization server in accordance with one embodiment of the present disclosure.

Reference is next made to FIG. 3 which shows in block diagram form a synchronization server 120 in accordance with one embodiment of the present disclosure. The synchronization server 120 is a computer implementing one or more server applications configured for performing the processes and functions described herein. The synchronization server 120 comprises a controller comprising at least one processor 302 (such as a microprocessor) for controlling its overall operation connected to a circuit board (not shown) to which other components are connected. The synchronization server 120 also comprises a communication subsystem 304 for performing communication functions for directly or indirectly communicating with various connection points of the synchronization system 100. The communication subsystem 304 provides access to the communication networks 103, 105 (e.g., Internet) including at least TCP/IP connectivity and possibly HTTP connectivity.

The synchronization server 120 may further comprise a display screen 342 or monitor connected to the microprocessor 302, one or more user input devices such as a keyboard 354 and navigation tool 360 (such as a mouse) connected to the microprocessor 302 for sending user input signals to the microprocessor 302 in response to user inputs, one or more memories or electronic storage elements connected to the microprocessor 302 such as a HDD 344 or other non-volatile memory such as flash memory, RAM 346, ROM 348, a data port 350 such as serial data port (for example, a USB data port), and auxiliary I/O devices 352. Other features of the synchronization server 120 for implementing the processes and functions described herein will be appreciated by persons ordinarily skilled in the art.

The microprocessor 302 operates under stored program control and executes software modules 320 stored in memory such as persistent memory, for example, in the HDD 344. The software modules 320 comprise operating system software 322, data 324, the one or more server accounting databases 122, Web server 130 for providing the Web server, synchronization Web service module for providing the synchronization Web service 131, authentication module 132 for authenticating user accounts and/or client computers 101, TCP/IP server 134 for providing TCP/IP connectivity for connection to client computers 101, server application interface module for provided the server application interface 124 for interacting with third party applications 140, and conflicts registry 136 storing conflicts which occurred during synchronization operations. Other data 324 and applications 326 necessary for performing the various functions of the synchronization server 120 are also stored on the HDD 344. Those skilled in the art will appreciate that the software modules 320 or parts thereof may be temporarily loaded into volatile memory such as the RAM 346. The RAM 346 is used for storing runtime data variables and other types of data or information, as will be apparent to those skilled in the art. Although specific functions are described for various types of memory, this is merely an example, and those skilled in the art will appreciate that a different assignment of functions to types of memory could also be used.

Full Synchronization

Figure 4:
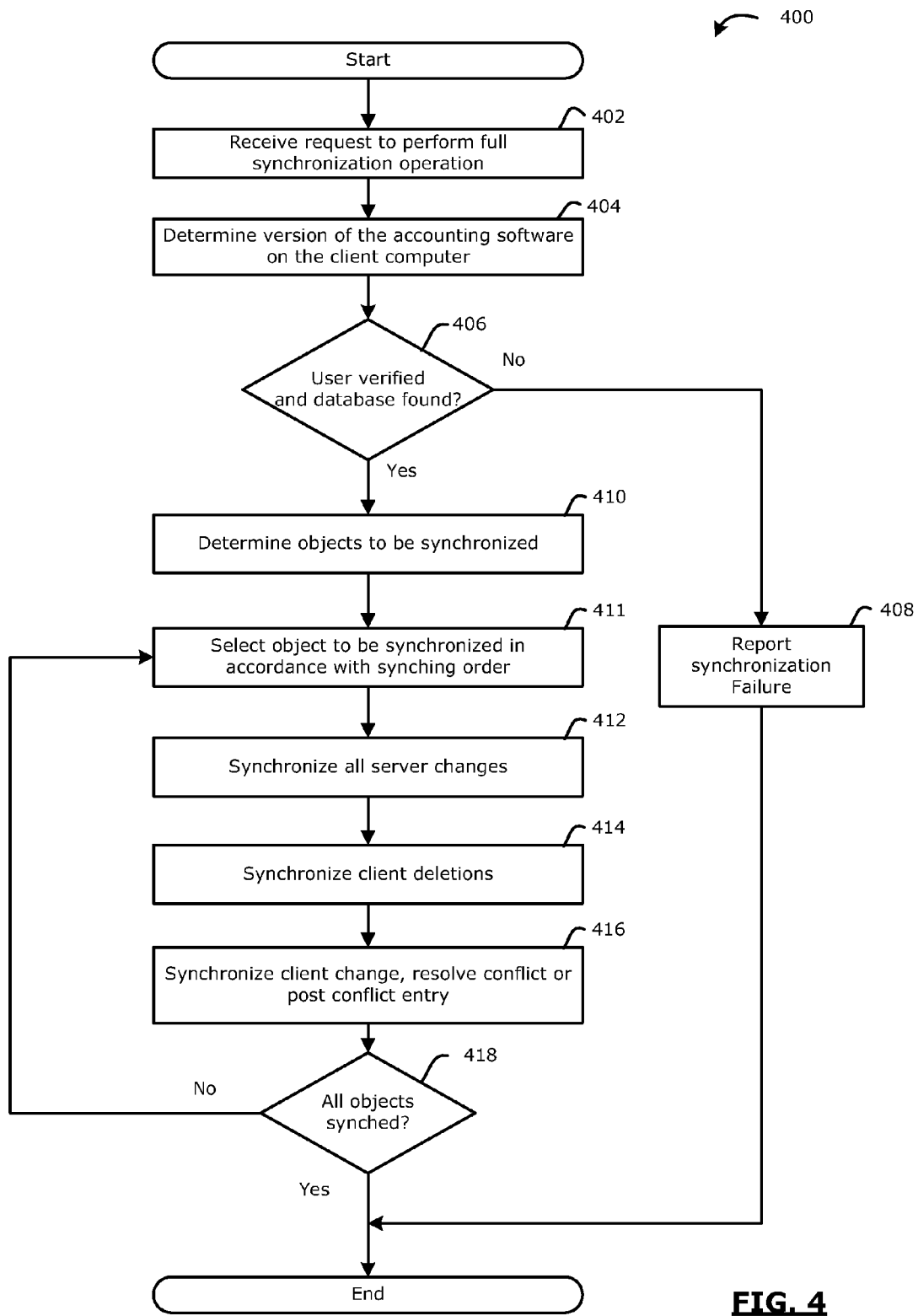
FIG. 4 is a flowchart illustrating example operations of a full synchronization of data in accordance with one embodiment of the present disclosure.

Referring now to FIG. 4, example operations 400 of a full synchronization method (sometimes referred to as a "full synch") in accordance with one embodiment of the present disclosure will now be described. The purpose of a full synchronization is to compare every record on the client accounting database 104 with every record in the server accounting database 122 and to update any client side or server side changes.

In the first step 402, a request to initiate a full synchronization is received by either from the integration engine 110 on the client computer 101 or the synchronization Web server 130 of the synchronization server 120. A full synchronization may be initiated in one of four ways: (1) in response to corresponding input received on the client computer 101 to perform a full synchronization, for example in response to user selection of a user interface element or menu option of the GUI of the accounting application 102 to perform a full synchronization; (2) in response to corresponding input received on the client computer 101 to connect to the client accounting database 104 when it has not been previously synchronized with the server accounting database 122, for example by user selection of a corresponding user interface element or menu option of the GUI of the accounting application 102 to "connect" to the client accounting database 104; (3) via the TCP/IP server 134 when a Web service or Web application calls on it to request a full synchronization from the integration engine 110 (for example, it is initiated in a third party application 140 in response to user input, which results in a call from the third party application 140 to the server application interface 124 which then calls the TCP/IP server 134); or (4) at a periodic intervals in accordance with synchronization preferences 116 set by the end user (e.g., every 24 hours). Periodic synchronization is typically initiated on the client side by the integration engine 110 in accordance with the synchronization preferences 116. In embodiments in which the synchronization preferences 116 are stored on the synchronization server 120, the synchronization preferences 116 are checked every time a synchronization operation is performed at which time the integration engine 110 sets a timer in accordance with the next scheduled full synchronization.

Next, in step 404 the integration engine 110 determines the version of the client accounting application 102 on the client computer 101 via the client request interface 112. The integration engine 110 may determine the version directly from the client request interface 112, or based on information provided by the client request interface 112. Alternatively, the client request interface 112 may determine the version based on information stored by the client accounting application 102 and provided the version to the integration engine 110. When the full synchronization operations 400 are initiated by the synchronization server 120, the synchronization Web service 131 instructs the integration engine 110 to determine the version of the client accounting application 102. In other embodiments, information regarding the software capabilities including the accounting objects, tables and fields supported other than the version of the client accounting application 102 may be used (e.g. release information, edition information, metadata, product description, etc.).

Next, in step 406 the integration engine 110 sends identifying information (e.g., user name and company account), a password and the current public IP address and port number for the connection to the TCP/IP server 134 to the synchronization Web service 131. The synchronization Web service 131 then sends this information to the authentication server 132 which validates the respective user account and determines whether there is a corresponding server accounting database 122 for the user account when initiated by the client, or whether there is a corresponding client accounting database 104 for the user account when initiated by the server. If a corresponding client accounting database 104 is not found, the synchronization operation fails.

When the synchronization operation fails, operations proceed to step 408 where the synchronization Web service 131 communicates the synchronization failure to the integration engine 110. The integration engine 110 may display a message including a notification of the synchronization failure on the display screen 242 of the client computer 101 to notify the user of the outcome, further processing stops and the operations 400 end.

When the user account is validated and a corresponding client accounting database 104 is found, processing proceeds to step 410.

Next, in step 410 the accounting objects to be synchronized is determined. This comprises downloading synchronization preferences 116 to the client computer 101 from the server 120, determining the tables supported by the client accounting application 102 and determining the respective permission attributes associated with each of the tables in the database 104. The integration engine 110 builds a list of the accounting objects in client accounting database 104 and server accounting database 122, determines changes in accounting objects between client accounting database 104 and server accounting database 122, and then builds a list of the accounting objects to be synchronized based on the determined changes.

Determining the tables supported by the client accounting application 102, in at least some embodiments, requires comparing the version of the client accounting application 102 with a predetermined mapping of version to tables to be synchronized. Thus, the list of tables to be synchronized can be different depending on the accounting software and the specific version of that accounting software.

Determining the respective permission attributes associated with each of the tables in the database 104 comprises determining whether the table permission attributes match a rule for synching the table. In some embodiments, each table has at least the following three flags (or other identifiers) associated with it: (1) Show/Hide; (2) Edit (true/false); and (3) Add (true/false). Each of the permission attribute flags control a permission associated with the table: the Show/Hide flag controls whether the table can be viewed; (2) the Edit flag controls whether the records in the table can be edited; and (3) the Add flag controls whether the records in the table can be added. The lowest level of permission is view (i.e. a table cannot be edited or added to if it cannot be viewed. In some embodiments, only tables supported by the client accounting application 102 which have a show (or view) permission flag are synchronized. For example, if the Invoice Table has a Show flag, a false Edit flag, and a true Add flag, the Invoice Table will be synchronized with the server accounting database 122 and will be viewable to the server 120 and third party applications 140. In addition, invoice records can be added to the table by the server 120 and third party applications 140, but invoice records cannot be edited by the server 120 and third party applications 140.

Each table's permission attributes are stored as a mapping separate from the table itself which associates the table by a table identifier (ID) with its respective permission attribute flags. These mappings/relations conform to the requirements of the SDK or API of the client accounting application 102 and are stored on the client computer 101 by the client accounting application 102 and on the server 120. These mappings/relations are updated during a synchronization operation to accommodate for changes to the client accounting application 102. This captures situations in which the client accounting application 102 has been upgraded from a lower version to a higher version and still maintains the same account with the server 120.

Next, in step 411 the first object to be synchronized in the list of objects is selected in accordance with the synching order described above.

The integration engine 110 requests a list of added, modified or deleted records from the synchronization Web service 131. The synchronization Web service 131 checks the server accounting database 122 for any records in the table that have been added, modified or marked for deletion and have not yet been synchronized to the accounting application 102. The synchronization Web service 131 then builds a list of these records and sends it back to the integration engine 110. As noted above, the records are provided in an XML file for each accounting object wherein each XML file includes a complete set of records for the respective accounting object.

If a record has been added to a table in the selected object on the server accounting database 122 and additions are permitted in accordance with the permission flags for the various fields in the table, the integration engine 110 will obtain the record from the server 120 and send an "Add Request" to the client request interface 112. Typically, the integration engine 110 receives a preformatted XML file from synchronization Web service 131 which formats the record according to version of the client accounting application 102 in accordance with its database schema. The web service 131 determines which fields in the object's table(s) to synchronize in accordance with the fields supported by the client accounting database 104 in a preliminary step. This determination is typically performed by analysing the version of the client accounting application 102. If the field is not supported by the client accounting database 104, it will not be synchronized. If there are differences between logically equivalent fields in the client accounting database 104 and server account database 122, translations may be performed typically on the server side by the server application interface 124. The permission flags associated with the fields will be considered during this process. As with tables, view, edit and add tags are associated with each field. Only fields with a view flag will be synchronized. Edit and add flags are also considered when a corresponding modification or addition has been made to the respective field in the server accounting database 122. In embodiments where formatting is not performed by the synchronization Web server 131, the integration engine 110 formats the record.

The client request interface 112 sends the record to the client accounting database 104 unless the "Add Request" is rejected. There are several reasons the request can be rejected, such as the record is a duplicate (e.g. duplicate name or number) or violates a business accounting logic rule. If the client request interface 112 rejects the "Add Request", the integration engine 110 notifies the synchronization Web service 131. In response to receiving a notification that the "Add Request" was rejected, the synchronization Web service 131 adds a corresponding entry in the conflicts registry 136.

If a record has been modified in the selected table in the server accounting database 122 and modifications are permitted in accordance with the permission flags for the various fields in the table, the integration engine 110 requests the modification date of the record in client accounting database 104 via the client request interface 112. As noted above, each record has a modification date which comprises a respective field in the respective table. If a record has been modified in both the client accounting database 104 and server accounting database 122 since the last synchronization, a conflict occurs. The last synchronization is determined by a last synchronization date stored on the synchronization server 120, typically in the synchronization preferences 116, and typically also includes the time of the last successful synchronization. The last synchronization may also be stored on the client computer 101. The last synchronization date is typically the date at which the last successful synchronization was started rather than the date last successful synchronization completed to accommodate any changes which may have occurred between the start and end of the last successful synchronization. A check of the user preference is then performed, and the conflict is resolved in accordance with user preferences. If the preference is that the record in the server accounting database 122 is to be used when a conflict occurs, the integration engine 110 sends a request to the client request interface 112 to replace the record in the client accounting database 104 with the record from server database 104. The record in the client accounting database 104 is replaced by the client accounting application 102 in response to receiving the request. This may require the modified record from the server accounting database 122 to be formatted by the integration engine 110 in accordance with the version of the accounting application 102 in embodiments where formatting is not performed by the synchronization Web server 131.

If the preference is that the record in the client accounting database 104 is to be used when a conflict occurs, the integration engine 110 sends a request to the synchronization Web service 131 to replace the record in the server accounting database 122 with the record from client accounting database 104. This may require the modified record from the client accounting database 104 to be formatted in accordance with the database schema of the server accounting database 122.

If the preference is to prompt the user when a conflict occurs, the integration engine 110 sends a notification to the synchronization Web service 131. The synchronization Web service 131 in response to the notification enters a conflict into the conflict registry 136.

If there are no conflicts, the integration engine 110 requests a modification of the record via the client request interface 112. If the record no longer exists in the client accounting database 104 or the modification request is rejected, the client request interface 112 notifies the integration engine 110. The integration engine 110 then sends a notification to the synchronization Web service 131. The synchronization Web service 131 in response to the notification enters a conflict into the conflict registry 136. Otherwise, the record in the client accounting database 104 is replaced by the client accounting application 102 in response to receiving the request. This may require the modified record from the server accounting database 122 to be formatted in accordance with the version of the accounting application 102.

If a record has been marked for deletion by the server 120, the integration engine 110 will request that the record will be deleted in the client accounting database 104 via the client request interface 112. If the client request interface 112 approves of the request, the record in the client accounting database 104 is deleted by the client accounting application 102 and the integration engine 110 notifies the synchronization Web service 131 unless the request is rejected. The synchronization Web service 131 in turn deletes the record from the server accounting database 122. If the deletion request is rejected, the client request interface 112 notifies the integration engine 110. A deletion could be rejected for a number of reasons, but usually because there are dependent records which depended from the record for which deletion was requested. For example, a customer cannot be deleted if there are transactions already existing for that customer. The integration engine 110 then sends a notification to the synchronization Web service 131. The synchronization Web service 131 in response to the notification enters a conflict into the conflict registry 136.

Next, in step 414 a check is performed to determine if any records in the selected table have been deleted in the client accounting database 104 since the last successful synchronization. The integration engine 110 sends a request to the client request interface 112 for a list of deleted transactions for this table that have occurred since the last successful synchronization. In other embodiments where the client accounting application 102 does not support a list of deleted transactions for this table that have occurred since the last successful synchronization (such as, for example, Simply Accounting), this step is omitted.

If the client request interface 112 provides a non-empty list, the integration engine 110 sends the list to the synchronization Web service 131 and requests the deletion of the corresponding records in the server accounting database 122. In response to receiving the request and the list, the synchronization Web service 131 deletes the corresponding records in the server accounting database 122. If the client request interface 112 provides an empty list, there are no records to be updated in the server accounting database 122 and processing process to the step 416.

Next, in step 416 a check is performed to determine if there are any differences between the selected table in the client accounting database 104 and the selected table in the server accounting database 122. If there are differences between logically equivalent fields in the client accounting database 104 and server account database 122, translations may be performed typically on the server side by the server application interface 124. The permission flags associated with the fields will be considered during this process. As with tables, view, edit and add tags are associated with each field. Only fields with a view flag will be synchronized. Edit and add flags are also considered when a corresponding modification or addition has been made to the respective field in the server accounting database 122.

The step 416 identifies any additions and modifications to the client accounting database 104 as well as any records that have been deleted on the server accounting database 122 or client accounting database 104 that were not identified in the foregoing steps. Deleted records which would not be identified in the foregoing steps are likely rare, but can happen in situations such as, for example, when the user performs a database restore on the client computer 101.

The integration engine 110 first requests a list of all records from the server accounting database 122 via the synchronization Web service 131. Next, the integration engine 110 requests a list of all records in the client accounting database 104 via client request interface 112. Next, the integration engine 110 compares each record in both lists to determine if any records are out of synchronization or are missing from either the client accounting database 104 or the server accounting database 122.

For the records that are out of synchronization, the integration engine 110 requests the synchronization Web service 131 to update the server accounting database 122 with the updated records from the client accounting database 104. Because server-side changes were already processed in step 412, there is no need to look at synchronization preferences 116 so the client accounting application 102 will "win" in the event of a conflict. For records that exist on the server accounting database 122 but no longer exist on the client accounting database 104, the integration engine 110 instructs the synchronization Web service 131 to make an entry in the conflict registry 136. This may require any added or modified record to be formatted in accordance with the version of the accounting application 102/client accounting database 104, or from the server accounting database 122, as the case may be.

As each record in table is synchronized, it is marked as being either: (i) partially synchronized using a status flag or other identifier such as, for example, a "temporary" status flag; or (ii) fully synchronized, for example, no "temporary" status flag is present. When all records in the selected table have been synchronized, the table is marked as being either: (i) partially synchronized; or (ii) fully synchronized using a status flag or other identifier. In some embodiments, a "Contains Unsynchronized Records" flag or "Does Not Contain Unsynchronized Records" flag is used to indicate the synchronization state of the table.

Next, in step 418 the integration engine 110 determines whether there are any tables in the list of tables that have yet to be synchronized. This involves looking at the status flags of the tables. If any of the tables have yet to be synchronized, processing loops back to step 410 and the next table in the list of tables is selected in accordance with the synching order.

The steps 412, 414, and 418 are then repeated. The synchronization operations 400 continue to loop until all tables in the list of tables to be synchronized have been synchronized. Once all the tables in the list of tables that have been synchronized, the operations 400 end.

Changes-Only Synchronization

Figure 5:
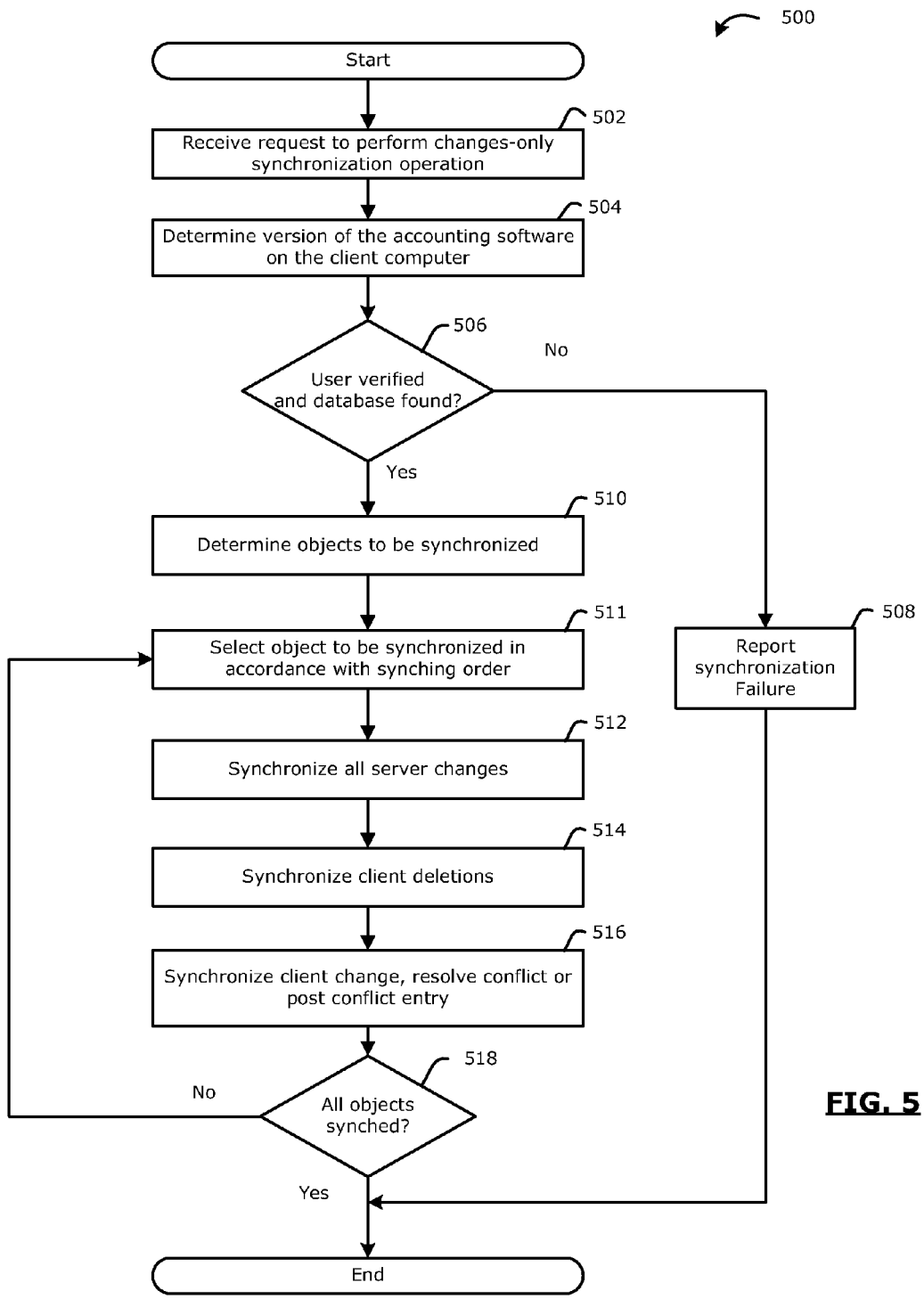
FIG. 5 is a flowchart illustrating example operations of a changes-only synchronization of data in accordance with one embodiment of the present disclosure.

Referring now to FIG. 5, example operations 500 of a "Changes-Only" synchronization method (sometimes referred to as a "changes-only synch") in accordance with one embodiment of the present disclosure will now be described. The purpose of a changes-only synchronization is to identify any changes on the client accounting database 104 and any changes on the server accounting database 122 since the last synchronization was performed, and to update any client side or server side changes since the last synchronization.

In the first step 502, a request to initiate a changes-only synchronization is received by either the integration engine 110 on the client computer 101 or the synchronization Web server 130 of the synchronization server 120. A changes-only synchronization may be initiated in one of four ways: (1) in response to corresponding input received on the client computer 101 to perform a changes-only synchronization, for example in response to user selection of a user interface element or menu option of the GUI of the integration engine 110 to perform a changes-only synchronization; (2) in response to corresponding input received on the client computer 101 to connect to the client accounting database 104, for example by user selection of a corresponding user interface element or menu option of the GUI of the integration engine 110 to "connect" to the client accounting database 104; (3) via the TCP/IP server 134 when a Web service or Web application calls on it to request a changes-only synchronization from the integration engine 110; or (4) at periodic intervals in accordance with preferences set by the end user (e.g., every 20 minutes).

Next, in step 504 the integration engine 110 determines the version of the client accounting application 102 on the client computer 101 via the client request interface 112. The integration engine 110 may determine the version directly from the client request interface 112, or based on information provided by the client request interface 112. Alternatively, the client request interface 112 may determine the version based on information stored by the client accounting application 102 and provided the version to the integration engine 110. When the changes-only synchronization operations 500 are initiated by the synchronization server 120, the synchronization Web service 131 instructs the integration engine 110 to determine the version of the client accounting application 102. In other embodiments, information regarding the software capabilities including the tables and fields supported other than the version of the client accounting application 102 may be used (e.g. release information, edition information, metadata, product description, etc.).

Next, in step 506 the integration engine 110 sends identifying information (e.g., user name and company account), a password and the current public IP address and port number for the connection to the TCP/IP server 134 to the synchronization Web service 131. The synchronization Web service 131 then sends this information to the authentication server 132 which validates the respective user account and determines whether there is a corresponding server accounting database 122 for the user account when initiated by the client, or whether there is a corresponding client accounting database 104 for the user account when initiated by the server. If a corresponding client accounting database 104 is not found, the synchronization operation fails.

When the synchronization operation fails, operations proceed to step 508 where the synchronization Web service 131 communicates the synchronization failure to the integration engine 110. The integration engine 110 may display a message including a notification of the synchronization failure on the display screen 242 of the client computer 101 to notify the user of the outcome, further processing stops and the operations 500 end.

When the user account is validated and a corresponding client accounting database 104 is found, processing proceeds to step 510.

Next, in step 510 the accounting objects to be synchronized is determined. This comprises downloading synchronization preferences 116 to the client computer 101 from the server 120, determining the tables supported by the client accounting application 102 and determining the respective permission attributes associated with each of the tables in the database 104. The integration engine 110 builds a list of the accounting objects in client accounting database 104 and server accounting database 122, determines changes in accounting objects between client accounting database 104 and server accounting database 122 since the last successful synchronization, and then builds a list of the accounting objects to be synchronized based on the determined changes.

Determining the tables supported by the client accounting application 102, in at least some embodiments, requires comparing the version of the client accounting application 102 with a predetermined mapping of version to tables to be synchronized. Thus, the list of tables to be synchronized can be different depending on the accounting software and the specific version of that accounting software.

Determining the respective permission attributes associated with each of the tables in the database 104 comprises determining whether the table permission attributes match a rule for synching the table. In some embodiments, each table has at least the following three flags (or other identifiers) associated with it: (1) Show/Hide; (2) Edit (true/false); and (3) Add (true/false). Each of the permission attribute flags control a permission associated with the table: the Show/Hide flag controls whether the table can be viewed; (2) the Edit flag controls whether the records in the table can be edited; and (3) the Add flag controls whether the records in the table can be added. The lowest level of permission is view (i.e. a table cannot be edited or added to if it cannot be viewed. In some embodiments, only tables supported by the client accounting application 102 which have a show (or view) permission flag are synchronized. For example, if the Invoice Table has a Show flag, a false Edit flag, and a true Add flag, the Invoice Table will be synchronized with the server accounting database 122 and will be viewable to the server 120 and third party applications 140. In addition, invoice records can be added to the table by the server 120 and third party applications 140, but invoice records cannot be edited by the server 120 and third party applications 140.

Each table's permission attributes are stored as a mapping separate from the table itself which associates the table by a table identifier (ID) with its respective permission attribute flags. These mappings/relations conform to the requirements of the SDK or API of the client accounting application 102 and are stored on the client computer 101 by the client accounting application 102 and on the server 120. These mappings/relations are updated during a synchronization operation to accommodate for changes to the client accounting application 102. This captures situations in which the client accounting application 102 has been upgraded from a lower version to a higher version and still maintains the same account with the server 120.

Next, in step 511 an accounting object for synchronization is selected in accordance with the synching order.

Next, in step 512 changes in the selected table in the server accounting database 122 are synchronized. The integration engine 110 requests a list of added, modified or deleted records from the synchronization Web service 131. The synchronization Web service 131 checks the server accounting database 122 for any records in the table that have been added, modified or marked for deletion and have not yet been synchronized to the accounting application 102. The synchronization Web service 131 then builds a list of these records and sends it back to the integration engine 110. As noted above, the records are provided in an XML file for each accounting object wherein each XML file includes a complete set of records for the respective accounting object.

If a record has been added to the selected table on the server accounting database 122 and additions are permitted in accordance with the permission flags for the various fields in the table, the integration engine 110 will obtain the record from the server 120 and send an "Add Request" to the client request interface 112. Typically, the integration engine 110 receives a preformatted XML file from synchronization Web service 131 which formats the record according to version of the client accounting application 102 in accordance with its database schema. The web service 131 determines which fields in the table to synchronize in accordance with the fields supported by the client accounting database 104, typically by analysing the version of the client accounting application 102. If the field is not supported by the client accounting database 104, it will not be synchronized. If there are differences between logically equivalent fields in the client accounting database 104 and server account database 122, translations may be performed typically on the server side by the server application interface 124. The permission flags associated with the fields will be considered during this process. As with tables, view, edit and add tags are associated with each field. Only fields with a view flag will be synchronized. Edit and add flags are also considered when a corresponding modification or addition has been made to the respective field in the server accounting database 122. In embodiments where formatting is not performed by the synchronization Web server 131, the integration engine 110 formats the record.

The client request interface 112 sends the record to the client accounting database 104 unless the "Add Request" is rejected. There are several reasons the request can be rejected, such as the record is a duplicate (e.g. duplicate name or number) or violates a business accounting logic rule. If the client request interface 112 rejects the "Add Request", the integration engine 110 notifies the synchronization Web service 131. In response to receiving a notification that the "Add Request" was rejected, the synchronization Web service 131 adds a corresponding entry in the conflicts registry 136.

If a record has been modified in the selected table in the server accounting database 122 and modifications are permitted in accordance with the permission flags for the various fields in the table, the integration engine 110 requests the modification date of the record in client accounting database 104 via the client request interface 112. As noted above, each record has a modification date which comprises a respective field in the respective table. If a record has been modified in both the client accounting database 104 and server accounting database 122 since the last synchronization, a conflict occurs. The last synchronization is determined by a last synchronization date stored on the synchronization server 120, typically in the synchronization preferences 116, and typically also includes the time of the last successful synchronization. The last synchronization date is typically the date at which the last successful synchronization was started rather than the date last successful synchronization completed to accommodate any changes which may have occurred between the start and end of the last successful synchronization. A check of the user preference is then performed, and the conflict is resolved in accordance with user preferences. If the preference is that the record in the server accounting database 122 is to be used when a conflict occurs, the integration engine 110 sends a request to the client request interface 112 to replace the record in the client accounting database 104 with the record from server database 104. The record in the client accounting database 104 is replaced by the client accounting application 102 in response to receiving the request. This may require the modified record from the server accounting database 122 to be formatted by the integration engine 110 in accordance with the version of the accounting application 102 in embodiments where formatting is not performed by the synchronization Web server 131.

If the preference is that the record in the client accounting database 104 is to be used when a conflict occurs, the integration engine 110 sends a request to the synchronization Web service 131 to replace the record in the server accounting database 122 with the record from client accounting database 104. This may require the modified record from the client accounting database 104 to be formatted in accordance with the database schema of the server accounting database 122.

If the preference is to prompt the user when a conflict occurs, the integration engine 110 sends a notification to the synchronization Web service 131. The synchronization Web service 131 in response to the notification enters a conflict into the conflict registry 136.

If there are no conflicts, the integration engine 110 requests a modification of the record via the client request interface 112. If the record no longer exists in the client accounting database 104 or the modification request is rejected, the client request interface 112 notifies the integration engine 110. The integration engine 110 then sends a notification to the synchronization Web service 131. The synchronization Web service 131 in response to the notification enters a conflict into the conflict registry 136. Otherwise, the record in the client accounting database 104 is replaced by the client accounting application 102 in response to receiving the request. This may require the modified record from the server accounting database 122 to be formatted in accordance with the version of the accounting application 102.

If a record has been marked for deletion by the server 120, the integration engine 110 will request that the record will be deleted in the client accounting database 104 via the client request interface 112. If the client request interface 112 approves of the request, the record in the client accounting database 104 is deleted by the client accounting application 102 and the integration engine 110 notifies the synchronization Web service 131 unless the request is rejected. The synchronization Web service 131 in turn deletes the record from the server accounting database 122. If the deletion request is rejected, the client request interface 112 notifies the integration engine 110. A deletion could be rejected for a number of reasons, but usually because there are dependent records which depended from the record for which deletion was requested. For example, a customer cannot be deleted if there are transactions already existing for that customer. The integration engine 110 then sends a notification to the synchronization Web service 131. The synchronization Web service 131 in response to the notification enters a conflict into the conflict registry 136.

Next, in step 514 a check is performed to determine if any records in the selected table have been deleted in the client accounting database 104 since the last successful synchronization. The integration engine 110 sends a request to the client request interface 112 for a list of deleted transactions for this table that have occurred since the last successful synchronization. In other embodiments where the client accounting application 102 does not support a list of deleted transactions for this table that have occurred since the last successful synchronization (such as, for example, Simply Accounting), this step is omitted.

If the client request interface 112 provides a non-empty list, the integration engine 110 sends the list to the synchronization Web service 131 and requests the deletion of the corresponding records in the server accounting database 122. In response to receiving the request and the list, the synchronization Web service 131 deletes the corresponding records in the server accounting database 122. If the client request interface 112 provides an empty list, there are no records to be updated in the server accounting database 122 and processing process to the step 516.

Next, in step 516 a check is performed on the client accounting database 104 to identify any recent changes that have occurred since the last synchronization in accordance with the last synchronization date.

The integration engine 110 first requests a list of any records modified since the last successful synchronization. For each changed record, the integration engine 110 requests the synchronization Web service 131 to update the server accounting database 122 with the updated records from the client accounting database 104. This may require any added or modified record to be formatted in accordance with the version of the server accounting database 122.

As each record in the table is synchronized, it is marked as being either: (i) partially synchronized using a status flag or other identifier such as, for example, a "temporary" status flag; or (ii) fully synchronized, for example, no "temporary" status flag is present. When all records in the selected table have been synchronized, the table is marked as being either: (i) partially synchronized; or (ii) fully synchronized using a status flag or other identifier. In some embodiments, a "Contains Unsynchronized Records" flag or "Does Not Contain Unsynchronized Records" flag is used to indicate the synchronization state of the table.

Next, in step 518 the integration engine 110 determines whether there are any tables in the list of tables that have yet to be synchronized. This involves looking at the status flags of the tables. If any of the tables have yet to be synchronized, processing loops back to step 510 and the next table in the list of tables is selected in accordance with the synching order. The steps 512, 514, and 518 are then repeated. The synchronization operations 500 continue to loop until all tables in the list of tables to be synchronized have been synchronized. Once all the tables in the list of tables that have been synchronized, the operations 500 end.

Real-Time (or "On-Demand") Client Initiated Synchronization

Figure 6:
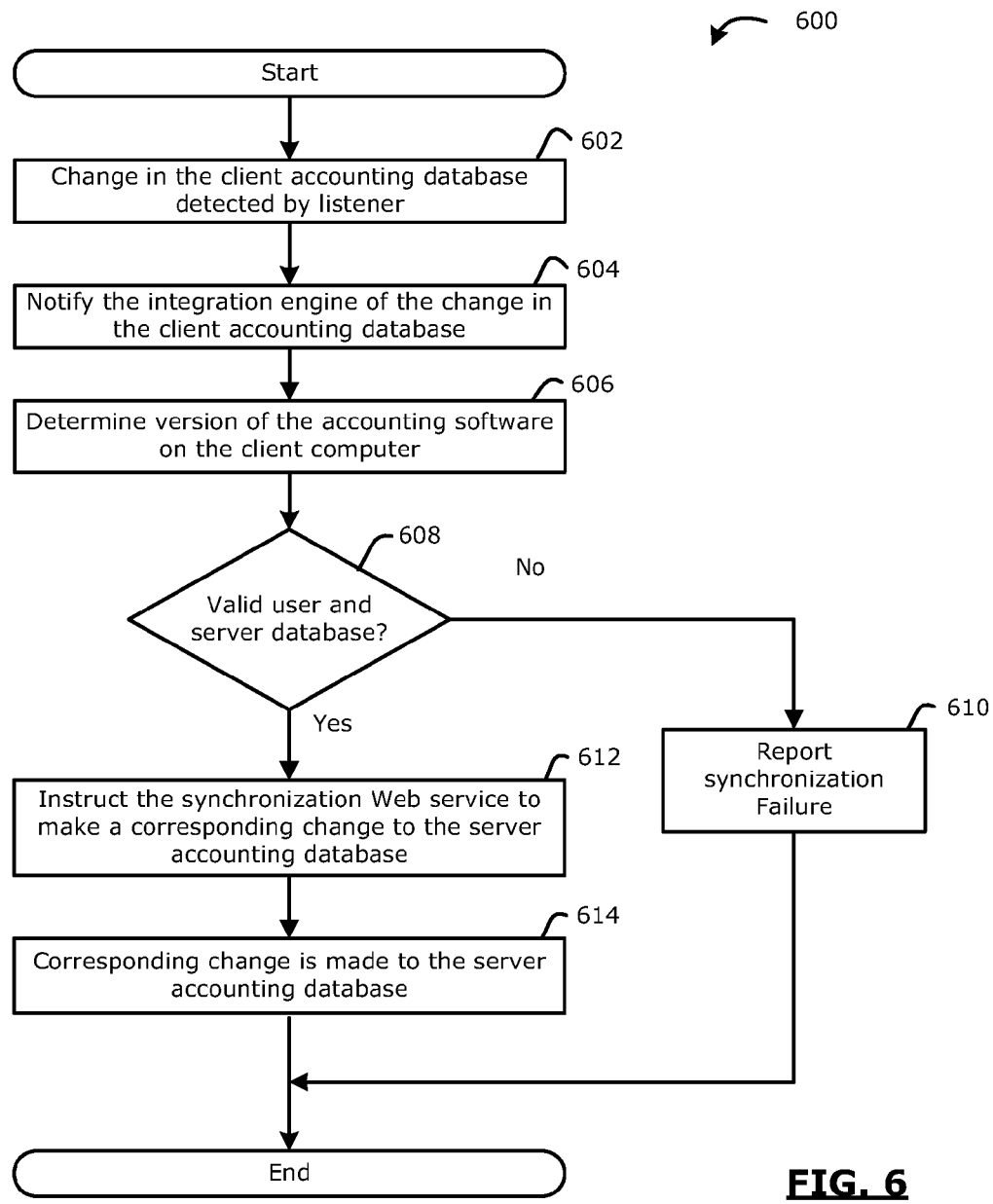
FIG. 6 is a flowchart illustrating example operations of a real-time client initiated synchronization of data in accordance with one embodiment of the present disclosure.

Referring now to FIG. 6, example operations 600 of a real-time client initiated synchronization method in accordance with one embodiment of the present disclosure will now be described. The purpose of real-time client initiated synchronization is to identify any changes on the client accounting database 104 in real-time and to synchronize those changes with the server accounting database 122. A real-time client initiated synchronization is initiated (or triggered) when a change is detected in the client accounting database 104 when the accounting application 102 and synchronization server 120 are connected to each other via the network 103.

In the first step 602, a change in one or more records occurs in the client accounting database 104. The change is detected by the client request interface 112 which notifies the listener 106 of the change. The listener 106 typically detects the notification from the client request interface 112, but could detect the change records in some embodiments.

Next, in step 604 the listener 106 notifies the integration engine 110 of the change in the client accounting database 104 in response to detection of the notification from the listener 106.

Next, in step 606 the integration engine 110 determines the version of the client accounting application 102 on the client computer 101 if the version information is not already known to the integration engine 110. The integration engine 110 may determine the version directly from the client request interface 112, or based on information provided by the client request interface 112. Alternatively, the client request interface 112 may determine the version based on information stored by the client accounting application 102 and provided the version to the integration engine 110. In other embodiments, information regarding the software capabilities including the accounting objects and/or tables supported other than the version of the client accounting application 102 may be used (e.g. release information, edition information, metadata, product description, etc.).

Next, in step 608 the user identity is verified and it is determined whether there is a corresponding server accounting database 122 for the user account. Typically, this comprises the user logging in to the server application 121 by providing requested identifying information and password (if any). The integration engine 110 sends the version information, provided identifying information, password and the current public IP address and port number for the connection to the TCP/IP server 134 to the synchronization Web service 131. The synchronization Web service 131 then sends this information to the authentication server 132 which validates the respective user account and determines whether there is a corresponding server accounting database 122 for the user account.

If the user account validation fails or a corresponding server accounting database 122 is not found, processing proceeds to step 610 in which the synchronization Web service 131 communicates the result (e.g., synchronization failure) to the integration engine 110. A message including a notification of the synchronization failure is displayed by the integration engine 110 on the display screen 242 of the client computer 101 to notify the user of the outcome, further processing stops and the operations 600 end.

If the user account is validated and a corresponding server accounting database 122 is found, processing proceeds to step 612.

Next, in step 612 the synchronization preferences 116 are downloaded to the client computer 101 from the server 120 and the integration engine 110 contacts the client request interface 112 and requests all accounting objects affected by the changed records from the client accounting database 104. The integration engine 110 sends the affected accounting objects to the synchronization Web service 131 in the form of an XML file for each accounting object, and instructs the synchronization Web service 131 to make corresponding changes to the affected accounting objects in the server accounting database 122. As noted above, each XML file includes a complete set of records for the respective accounting object.

Next, in step 614 the changed record is added to the respective table, deleted from to the respective table, or replaces the corresponding record in the respective table. This applies to additions, modifications and deletions to records. There is no chance for rejection or conflict between the client accounting database 104 and the server accounting database 122. The synchronization server 120 must accept all changes from the client accounting database 104. The operations 600 then end.

Real-Time (or "On-Demand") Server Initiated Synchronization

Figure 7:
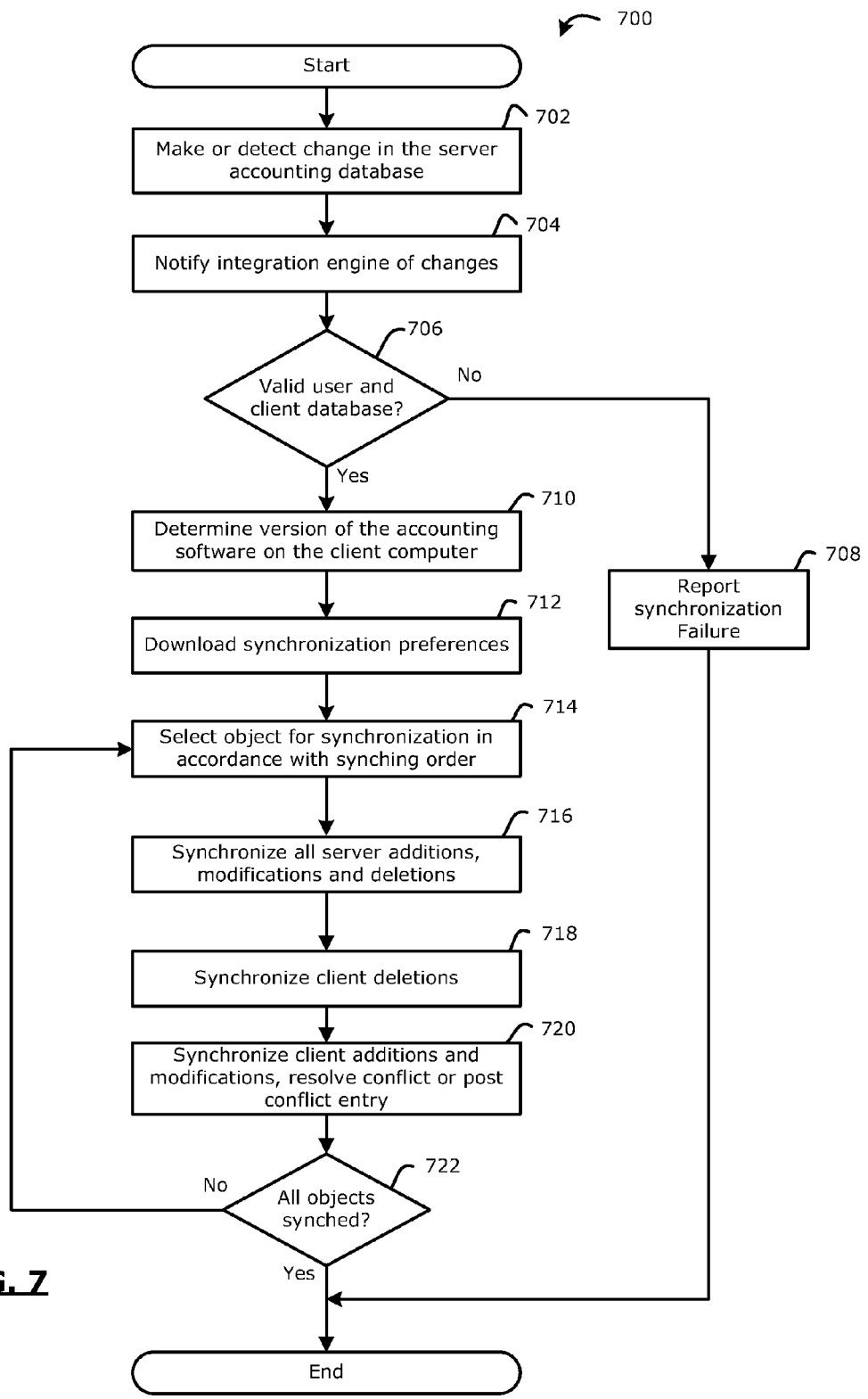
FIG. 7 is a flowchart illustrating example operations of a real-time server initiated synchronization of data in accordance with one embodiment of the present disclosure.

Referring now to FIG. 7, example operations 700 of a real-time server initiated synchronization method in accordance with one embodiment of the present disclosure will now be described. The purpose of real-time server initiated synchronization is to identify any changes on the server accounting database 122 in real-time and to synchronize those changes with the client accounting database 104. A real-time server initiated synchronization is initiated (or triggered) when a notifiable change is detected in the server accounting database 122 when the accounting application 102 and synchronization server 120 are connected to each other via the network 103. Only changes to accounting fields will cause a notification and which will be detected by the server application interface 124 and trigger a real-time server synchronization operation. For example, a user of a third party application 140 can add "non-accounting" field on the server accounting database 122 to an accounting object, for example, for informational purposes only. If the change was in relation to a non-accounting field and not any of the accounting fields, it would not be a notifiable change.

In accordance with the example embodiments of the present disclosure, a TCP/IP connection between the client computer 101 and a TCP/IP server 134 of the synchronization server 120 is required for a real-time server synchronization operation to be performed. Each time the client accounting application 102 is started on the client computer 101, the integration engine 110 sends a request to the Web server 130 for the assignment of a TCP/IP server 134. The synchronization server 120 may have one or more multiple TCP/IP servers depending on the embodiment and implementation.

Next, the integration engine 110 then initiates a TCP/IP connection with the assigned TCP/IP server 134. With the TCP/IP connection, the client computer 101 acts as a "client" rather than a "server" to avoid or reduce connectivity problems relating to firewalls and shared public IP addresses on multiple computers in a networked environment.

Next, a public IP address and port for connecting to the assigned TCP/IP server 134 is assigned to the client computer 101 for use by the integration engine 110.

Next, the integration engine 110 notifies the Web server 130 that it has successfully made a connection to the TCP/IP server 134, and registers an identifier (e.g., such as a user name and/or company account) with the corresponding public IP address and port. Each TCP/IP server 134 maintains many active simultaneous connections from many users/company accounts, each with their own public IP address and port.

In the first step 702, one or more changes in the server accounting database 122 are detected by the synchronization server 120. The change in the server accounting database 122 may be made by the server application interface 124, for example, as a result of instructions from an authorization third party application 140, or detected by the server application interface 124.

Next, in step 704 the server application interface 124 communicates the one or more changes which have occurred in the server accounting database 122 to an integration engine 110 on a client computer 101 associated with the changed records(s) via a TCP/IP call from the TCP/IP server 134 to the client computer 101 via its public IP address and port. This step comprises a number of sub-steps.

First, the server application interface 124 checks a registry of the Web server 130 to ensure that a TCP/IP connection currently exists to a client computer 101 associated with the server accounting database 122 have the changed records(s). As noted above, a TCP/IP connection between the client computer 101 and a TCP/IP server 134 of the synchronization server 120 is required for a real-time server synchronization operation to be performed. While this connection is typically established each time the client accounting application 102 is started on the client computer 101, the client computer 101 and synchronization server 120 can be disconnected for a number of reasons.

The registry check is performed using identifying information associated with the changed records(s) in server accounting databases 122, such as a user name or ID, a company account name or ID, a tenant ID, or any combination thereof. The identifying information associated with the changed records(s) is compared against identifying information associated with existing TCP/IP connection.

Next, the server application interface 124 calls the assigned TCP/IP server 134 to notify the integration engine 110 on the client computer 101 of the changed records(s) via its local TCP/IP client. The TCP/IP server 134 identifies the respective TCP/IP connection from many possible TCP/IP connections via the public IP address and port identified above which are passed to the TCP/IP server 134 from the server application interface 124.

When a TCP/IP connection does not exist for the respective client computer 101, the synch operations fail as the TCP/IP connection must be established by a user on the client computer 101 for user authentication and security purposes.

Next, in step 706 a series of checks are performed by the integration engine 110 to validate the synchronization operation and obtain information required for the synchronization operation. First, the integration engine 110 sends identifying information (e.g., user name and company account) previously provided, password and the current public IP address and port number for the connection to the TCP/IP server 134 to the synchronization Web service 131. The synchronization Web service 131 then sends this information to the authentication server 132 which validates the respective user account and determines whether there is a corresponding server accounting database 122 for the user account. If a corresponding client accounting database 104 is not found, the synchronization operation fails.

When the synchronization operation fails, operations proceed to step 708 where the synchronization Web service 131 communicates the synchronization failure to the integration engine 110. The integration engine 110 may display a message including a notification of the synchronization failure on the display screen 242 of the client computer 101 to notify the user of the outcome, further processing stops and the operations 700 end.

When the user account is validated and a corresponding client accounting database 104 is found, processing proceeds to step 712.

Next, in step 710 the synchronization Web service 131 requests and obtains from the integration engine 110 the version of the client accounting application 102 on the client computer 101 associated with the current public IP address and port number. The integration engine 110 determines the version of the client accounting application 102 on the client computer 101 via the client request interface 112 if the version information is not already known to the integration engine 110.

The integration engine 110 may determine the version directly from the client request interface 112 or based on information provided by the client request interface 112. Alternatively, the client request interface 112 may determine the version based on information stored by the client accounting application 102 and provide the version to the integration engine 110. In some embodiments, version information regarding the software capabilities of the client accounting application 102, such as the accounting objects, tables and fields supported by the client accounting application 102, may be used to determine the version of the client accounting application 102 rather than a version number, release information, edition information, metadata, product description, etc. This step is optional and may not be performed in all embodiments.

Next, in step 712 the synchronization preferences 116 are downloaded to the client computer 101 from the server 120 and the integration engine 110 requests from synchronization Web service 131 a list of the one or more changed records in the server accounting database 122. Next, a changes-only synchronization will be performed for the corresponding records in the client accounting database 104 and only those records. Unchanged records are not synchronized.

Next, in step 714 an accounting object is selected for synchronization in accordance with the synching order.

Next, in step 716 the selected accounting object in the client accounting database 104 is synchronized to match the pair version of the selected accounting object in the server accounting database 122 to reflect the change records detected by the server 120.

The integration engine 110 requests a list of added, modified or deleted records from the synchronization Web service 131. The synchronization Web service 131 checks the server accounting database 122 for any records in the selected accounting object that have been added, modified or marked for deletion and have not yet been synchronized to the client accounting application 102. The synchronization Web service 131 then builds a list of these records and sends it back to the integration engine 110.

If one or more records have been added to the selected accounting object in the server accounting database 122 and additions are permitted in accordance with the permission flags for the various fields in the record type, the synchronization Web service 131 will create an XML file on the server 120 comprising the selecting accounting object defined affected the added record and sent the XML file to the integration engine 110 on the client computer 101 with an "Add Request" to the client request interface 112. The XML file comprises all records which make up the selected accounting object.

In the process of creating the XML file, the synchronization Web service 131 will determine the fields to include in the XML file based on the fields supported by the version of the client accounting application 102. If the field is not supported by the client accounting database 104, it will not be synchronized. If there are differences between logically equivalent fields in the client accounting database 104 and server account database 122, translations may be performed typically on the server side by the server application interface 124. The permission flags associated with the fields will be considered during this process. View, edit and add tags are associated with each field. Only fields with a view flag will be synchronized. Edit and add flags are also considered when a corresponding modification or addition has been made to the respective field in the server accounting database 122.

It will be appreciated that while XML is used in the described embodiment, document formats other than XML could be used in other embodiments.

The client request interface 112 will send the record to the client accounting database 104 to be added by the client accounting application 102 unless the add Request is rejected. If the client request interface 112 rejects the add request, the integration engine 110 notifies the synchronization Web service 131. In response to receiving a notification that the add request was rejected, the synchronization Web service 131 adds a corresponding entry in the conflicts registry 136. When the add request is accepted, the record is added to the client accounting database 104 by the client accounting application 102.

If one or more records have been modified in the selected accounting object in the server accounting database 122 and modifications are permitted in accordance with the permission flags for the various fields in the record type, the integration engine 110 requests the modification date of the record in client accounting database 104 via the client request interface 112. As noted above, each record has a modification date which comprises a respective field in the respective object. If a record has been modified in both the client accounting database 104 and server accounting database 122 since the last synchronization, a conflict occurs.

Conflicts are resolved in accordance with the synchronization preferences 116. If the preference is that the record in the server accounting database 122 is to be used when a conflict occurs, the integration engine 110 sends a request to the client request interface 112 to replace the record in the client accounting database 104 with the record from server database 104. The record in the client accounting database 104 is replaced by the client accounting application 102 in response to receiving the request. This may require the modified record from the server accounting database 122 to be formatted in accordance with the version of the accounting application 102.

If the preference is that the record in the client accounting database 104 is to be used when a conflict occurs, the integration engine 110 sends a request to the synchronization Web service 131 to replace the record in the server accounting database 122 with the record from client accounting database 104. This may require the modified record from the client accounting database 104 to be formatted in accordance with the database schema of the server accounting database 122.

If the preference is to prompt the user when a conflict occurs, the integration engine 110 sends a notification to the synchronization Web service 131. The synchronization Web service 131 in response to the notification enters a conflict into the conflict registry 136.

If there are no conflicts, the integration engine 110 requests a modification of the record via the client request interface 112. If the record no longer exists in the client accounting database 104 or the modification request is rejected, the client request interface 112 notifies the integration engine 110. The integration engine 110 then sends a notification to the synchronization Web service 131. The synchronization Web service 131 in response to the notification enters a conflict into the conflict registry 136. Otherwise, the record in the client accounting database 104 is replaced by the client accounting application 102 in response to receiving the request. This may require the modified record from the server accounting database 122 to be formatted in accordance with the version of the accounting application 102.

If one or more records in the selected accounting object in the server accounting database 122 have been marked for deletion by the server 120, the integration engine 110 will request that the record will be deleted in the client accounting database 104 via the client request interface 112. If the client request interface 112 approves of the request, the record in the client accounting database 104 is deleted by the client accounting application 102 and the integration engine 110 notifies the synchronization Web service 131 unless the request is rejected. The synchronization Web service 131 in turn deletes the record from the server accounting database 122. If the deletion request is rejected, the client request interface 112 notifies the integration engine 110. The integration engine 110 then sends a notification to the synchronization Web service 131. The synchronization Web service 131 in response to the notification enters a conflict into the conflict registry 136.

Next, in step 718 a check is performed to determine if any records in the selected accounting object have been deleted in the client accounting database 104 since the last successful synchronization. This requires the integration engine 110 to send a request to the client request interface 112 for a list of deleted transactions for this object that have occurred since the last successful synchronization. If the client request interface 112 provides a non-empty list to the integration engine 110, the integration engine 110 will in turn send the non-empty list to the synchronization Web service 131 and requests the deletion of the corresponding records in the server accounting database 122. In response to receiving the request and the list, the synchronization Web service 131 deletes the corresponding records in the server accounting database 122. If the client request interface 112 provides an empty list, there are no records to be updated in the server accounting database 122 and processing process to the step 720.

Next, in step 720 a check is performed on the client accounting database 104 to identify any changed or added records since the last synchronization in accordance with the last synchronization date. As a preliminary step, the integration engine 110 determines which records in the selected accounting object to synchronize in accordance with the fields supported by the client accounting database 104, typically by analysing the version of the client accounting application 102. If the field is not supported by the client accounting database 104, it will not be synchronized. If there are differences between logically equivalent fields in the client accounting database 104 and server account database 122, translations may be performed typically on the server side by the server application interface 124. The permission flags associated with the fields will be considered during this process. View, edit and add tags are associated with each field. Only fields with a view flag will be synchronized. Edit and add flags are also considered when a corresponding modification or addition has been made to the respective field in the server accounting database 122.

The integration engine 110 first requests a list of any records modified since the last successfully synchronization. For each changed record, the integration engine 110 requests the synchronization Web service 131 to update the server accounting database 122 with the updated records from the client accounting database 104. This may require any added or modified record to be formatted in accordance with the version of the server accounting database 122.

As each record in the selected accounting object is synchronized, it is marked as being either: (i) partially synchronized using a status flag or other identifier such as, for example, a "temporary" status flag; or (ii) fully synchronized, for example, no "temporary" status flag is present. When each record in the selected accounting object has undergone a change/synchronization operation performed once, if partially synchronized records exist, the change/synchronization operation is repeated on partially synchronized records until all of the interdependent records are fully synchronized.

It will be appreciated that steps 718 and 720 provide the synchronization of changes made in the client accounting database 104 in addition to changes made in the server accounting database 122. This is the result of calling shared functions between the operations 400 and 700 in the described embodiments. It will be appreciated that the synchronization of client-side changes not required for a real-time synchronization of server-side changes in the server accounting database 122. Accordingly, in other embodiments, for example embodiments in which functions are not shared between the processes 400 and 700, the steps 718 and 720 may be omitted.

Next, in step 722 the integration engine 110 determines whether there are any objects that have yet to be synchronized. Once all accounting objects have been synchronized, the operations 700 end.

While the operations 400, 500, 600 and 700 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. For example, version information can be determined before or after validating the user and the existing of the required accounting databases.

While example embodiments have been described in the present disclosure in relation to the QuickBooks accounting software, the teachings of the present disclosure can be applied to other business accounting software which provide SDK, an API, or otherwise the ability to directly read and write to the accounting software database. Examples of suitable accounting software with which the teachings of the present disclosure may be used are QuickBooks® provided by Intuit Inc., PeachTree™ provided by Sage Software, Simply Accounting™ provided by Sage Software, Microsoft Dynamics™ provided by Microsoft Corporation, and Microsoft Small Business Accounting™ provided by Microsoft Corporation.

While the present disclosure is primarily described in terms of methods, a person of ordinary skill in the art will understand that the present disclosure is also directed to various apparatus such as a client computer and server including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for use on a server of synchronizing data between a client accounting database on a client computer and the server accounting database on the server, the client computer and server being connected over a communication network by a connection, each of the client accounting database and server accounting database comprising a number of tables, wherein accounting objects are defined by a group of one or more related records in one or more tables in the client accounting database and server accounting database, the method comprising:

detecting one or more records in the server accounting database which have changed since a previous synchronization;

identifying one or more accounting objects to be synchronized in accordance with the one or more changed records; and sending instructions to the client computer to synchronize the one or more accounting objects defined by the one or more changed records in the server accounting database with the client accounting database, wherein the one or more accounting objects are synchronized in accordance with a synching order defining an order in which accounting objects are synchronized;

wherein the synching order is determined in accordance with predetermined dependencies between records in the tables and predetermined business accounting logic rules;

wherein the accounting objects each belong to one of a number of predetermined categories, wherein the synching order defines an order in which the categories of accounting objects are synchronized so that accounting objects defined by the one or more changed records in the one or more tables are synchronized in accordance with a category of the respective accounting objects;

wherein the categories of accounting objects are synchronized in the following order: (1) independent list objects; (2) dependent list objects; (3) transaction objects which do not affect Accounts Receivable or Accounts Payable; (4) transaction objects that debit Accounts Receivable; (5) transactions objects that credit Accounts Receivable; (6) transactions objects that credit Accounts Payable; and (7) transactions objects that debit Accounts Payable.

2. The method of claim 1, further comprising:
notifying the client computer of the one or more changed records.

3. The method of claim 1, wherein a number of connections exist between the server and each of a number of client computers, the further comprising:

identifying the connection with client computer from the number of connections using identifying information associated with the one or more changed records in server accounting database.

4. The method of claim 1, wherein the connection is a Transmission Control Protocol/Internet Protocol (TCP/IP) connection between the client computer and server.

5. The method of claim 4, wherein the server identifies the TCP/IP connection with client computer from multiple TCP/IP connections via a public Internet Protocol (IP) address and port for connecting to the client computer.

6. The method of claim 1, wherein the predetermined accounting business logic rules define predetermined mappings between one or more records in one or more tables in accordance with logical relationships between the one or more records in the one or more tables based on business accounting rules, wherein the synching order is defined so as to preserve the logical relationships of the business accounting logic rules.

7. The method of claim 1, wherein the synching order is defined in accordance with the dependencies to preserve forward and backward dependencies between one or more records in the one or more tables.

8. The method of claim 1, wherein each accounting object within a category of accounting objects is synchronized in series, wherein at least some of the records of at least one of the tables are dependent records having dependencies between one or more records in the two or more tables or interdependent records having interdependencies between one or more records in the two or more tables, wherein the dependent or interdependent records are synchronized over a number of change operations, wherein one or more dependent or interdependent records are partially synchronized during each of the change operations and the change operations are repeated on partially synchronized records until all of the dependent or interdependent records are fully synchronized, and wherein the synching order is defined so as to minimize the number of change operations required to fully synchronize the interdependent records.

9. The method of claim 8, wherein interdependent records which are partially synchronized in the change operations are marked with a temporary status flag which is removed during subsequent change operations when the respective interdependent records are fully synchronized.

10. A server, comprising:
a controller;
a communication subsystem connected to the controller for communicating over a communication network;
a server accounting database comprising a number of tables connected to the controller, wherein accounting objects are defined by a group of one or more related records in one or more tables in the server accounting database;
wherein the controller is configured for: causing communication with a client computer over the communication network over a connection, wherein the client computer has a client accounting database comprising a number of tables, wherein accounting objects are defined by a group of one or more related records in one or more tables in the client accounting database;
wherein the controller is further configured for: detecting one or more records in the server accounting database which have changed since a previous synchronization; identifying one or more accounting objects to be synchronized in accordance with the one or more changed records; and sending instructions to the client computer to synchronize the one or more accounting objects defined by the one or more changed records in the server accounting database with the client accounting database, wherein the one or more accounting objects are synchronized in accordance with a synching order defining an order in which accounting objects are synchronized;
wherein the synching order is determined in accordance with predetermined dependencies between records in the tables and predetermined business accounting logic rules;
wherein the accounting objects each belong to one of a number of predetermined categories, wherein the synching order defines an order in which the categories of accounting objects are synchronized so that accounting objects defined by the one or more changed records in the one or more tables are synchronized in accordance with a category of the respective accounting objects;
wherein the categories of accounting objects are synchronized in the following order: (1) independent list objects; (2) dependent list objects; (3) transaction objects which do not affect Accounts Receivable or Accounts Payable; (4) transaction objects that debit Accounts Receivable; (5) transactions objects that credit Accounts Receivable; (6) transactions objects that credit Accounts Payable; and (7) transactions objects that debit Accounts Payable.

11. A method of synchronizing data between a client accounting database on the client computer and a server accounting database on a server, the client computer and server being connected over a communication network by a connection, each of the client accounting database and server accounting database comprising a number of tables, wherein accounting objects are defined by a group of one or more related records in one or more tables in the client accounting database and server accounting database, the method comprising:
identifying one or more accounting objects to be synchronized in accordance with any changed records in the client accounting database, server accounting database, or both;
sending instructions to the client computer to synchronize one or more accounting objects defined by any changed records in the server accounting database with the client accounting database; and
sending instructions to the server to synchronize one or more accounting objects defined by any changed records in the client accounting database with the server accounting database;
wherein the one or more accounting objects are synchronized in accordance with a synching order defining an order in which accounting objects are synchronized;
wherein the synching order is determined in accordance with predetermined dependencies between records in the tables and predetermined business accounting logic rules;
wherein the accounting objects each belong to one of a number of predetermined categories, wherein the synching order defines an order in which the categories of accounting objects are synchronized so that accounting objects defined by the one or more changed records in the one or more tables are synchronized in accordance with a category of the respective accounting objects;
wherein the categories of accounting objects are synchronized in the following order: (1) independent list objects; (2) dependent list objects; (3) transaction objects which do not affect Accounts Receivable or Accounts Payable; (4) transaction objects that debit Accounts Receivable; (5) transactions objects that credit Accounts Receivable; (6) transactions objects that credit Accounts Payable; and (7) transactions objects that debit Accounts Payable.

12. The method of claim 11, further comprising:
determining records in the client accounting database which have changed since a previous synchronization.

13. The method of claim 11, wherein the predetermined accounting business logic rules define predetermined mappings between one or more records in one or more tables in accordance with logical relationships between the one or more records in the one or more tables based on business accounting rules, wherein the synching order is defined so as to preserve the logical relationships of the business accounting logic rules.

14. The method of claim 11, wherein the synching order is defined in accordance with the dependencies to preserve forward and backward dependencies between one or more records in the one or more tables.

15. The method of claim 11, wherein each accounting object within a category of accounting objects is synchronized in series, wherein at least some of the records of at least one of the tables are dependent records having dependencies between one or more records in the two or more tables or interdependent records having interdependencies between one or more records in the two or more tables, wherein the dependent or interdependent records are synchronized over a number of change operations, wherein one or more dependent or interdependent records are partially synchronized during each of the change operations and the change operations are repeated on partially synchronized records until all of the dependent or interdependent records are fully synchronized, and wherein the synching order is defined so as to minimize the number of change operations required to fully synchronize the interdependent records.

16. The method of claim 15, wherein interdependent records which are partially synchronized in the change operations are marked with a temporary status flag which is removed during subsequent change operations when the respective interdependent records are fully synchronized.

17. A client computer, comprising:
a controller;
a communication subsystem connected to the controller for communicating over a communication network;
a client accounting database comprising a number of tables connected to the controller, wherein accounting objects are defined by a group of one or more related records in one or more tables in the client accounting database;
wherein the controller is configured for: causing communication with a server over the communication network over a connection, wherein the server has a server accounting database comprising a number of tables, wherein accounting objects are defined by a group of one or more related records in one or more tables in the server accounting database;
wherein the controller is configured for: synchronizing, in response to receiving instructions from the server, the one or more changed records with the client accounting database, wherein the one or more accounting objects are synchronized in accordance with a synching order defining an order in which accounting objects are synchronized;
wherein the synching order is determined in accordance with predetermined dependencies between records in the tables and predetermined business accounting logic rules;
wherein the accounting objects each belong to one of a number of predetermined categories, wherein the synching order defines an order in which the categories of accounting objects are synchronized so that accounting objects defined by the one or more changed records in the one or more tables are synchronized in accordance with a category of the respective accounting objects;
wherein the categories of accounting objects are synchronized in the following order: (1) independent list objects; (2) dependent list objects; (3) transaction objects which do not affect Accounts Receivable or Accounts Payable; (4) transaction objects that debit Accounts Receivable; (5) transactions objects that credit Accounts Receivable; (6) transactions objects that credit Accounts Payable; and (7) transactions objects that debit Accounts Payable.

18. The computer of claim 17, wherein the controller is further configured for: detecting one or more records in the client accounting database which have changed since a previous synchronization; identifying one or more accounting objects to be synchronized in accordance with the one or more changed records; and sending instructions to the server to synchronize the one or more accounting objects defined by the one or more changed records in the client accounting database with the server accounting database in accordance with the synching order.

19. A method for use on a client computer of synchronizing data between a client accounting database on the client computer and a server accounting database on a server, the client computer and server being connected over a communication network by a connection, each of the client accounting database and server accounting database comprising a number of tables, wherein accounting objects are defined by a group of one or more related records in one or more tables in the client accounting database and server accounting database, the method comprising:
detecting one or more records in the client accounting database which have changed since a previous synchronization;
identifying one or more accounting objects to be synchronized in accordance with the one or more changed records; and
sending instructions to the server to synchronize the one or more accounting objects defined by the one or more changed records in the client accounting database with the server accounting database, wherein the one or more accounting objects are synchronized in accordance with a synching order defining an order in which accounting objects are synchronized;
wherein the synching order is determined in accordance with predetermined dependencies between records in the tables and predetermined business accounting logic rules;
wherein the accounting objects each belong to one of a number of predetermined categories, wherein the synching order defines an order in which the categories of accounting objects are synchronized so that accounting objects defined by the one or more changed records in the one or more tables are synchronized in accordance with a category of the respective accounting objects;
wherein the categories of accounting objects are synchronized in the following order: (1) independent list objects; (2) dependent list objects; (3) transaction objects which do not affect Accounts Receivable or Accounts Payable; (4) transaction objects that debit Accounts Receivable; (5) transactions objects that credit Accounts Receivable; (6) transactions objects that credit Accounts Payable; and (7) transactions objects that debit Accounts Payable.

* * * * *